US 11,385,081 B2

(12) United States Patent
Goto

(10) Patent No.: US 11,385,081 B2
(45) Date of Patent: Jul. 12, 2022

(54) ENCODER APPARATUS, DRIVE APPARATUS, STAGE APPARATUS, AND ROBOT APPARATUS WITH LIGHT EMISSION ADJUSTER

(71) Applicant: NIKON CORPORATION, Tokyo (JP)

(72) Inventor: Masahiko Goto, Tokyo (JP)

(73) Assignee: NIKON CORPORATION, Tokyo (JP)

(*) Notice: Subject to any disclaimer, the term of this patent is extended or adjusted under 35 U.S.C. 154(b) by 328 days.

(21) Appl. No.: 16/036,115

(22) Filed: Jul. 16, 2018

(65) Prior Publication Data

US 2018/0340799 A1 Nov. 29, 2018

Related U.S. Application Data

(63) Continuation of application No. PCT/JP2017/000285, filed on Jan. 6, 2017.

(30) Foreign Application Priority Data

Jan. 18, 2016 (JP) .............................. JP2016-007469

(51) Int. Cl.
*G01D 5/347* (2006.01)
*B25J 19/02* (2006.01)
(Continued)

(52) U.S. Cl.
CPC ............ *G01D 5/3473* (2013.01); *B25J 19/02* (2013.01); *G01D 5/24447* (2013.01);
(Continued)

(58) Field of Classification Search
CPC ............ G01D 5/3473; G01D 5/24447; G01D 5/34715; G01D 5/56; G01D 5/58; G01D 5/145; B25J 19/02
See application file for complete search history.

(56) References Cited

U.S. PATENT DOCUMENTS

2005/0212513 A1 9/2005 Yamashita et al.
2005/0259263 A1* 11/2005 Schrammli ......... B41F 33/0036
356/444
(Continued)

FOREIGN PATENT DOCUMENTS

JP S64-065415 A 3/1989
JP H03-276018 A 12/1991
(Continued)

OTHER PUBLICATIONS

Mar. 28, 2017 International Search Report issued in International Patent Application PCT/JP2017/000285.
(Continued)

*Primary Examiner* — Jennifer D Bennett
(74) *Attorney, Agent, or Firm* — Oliff PLC

(57) ABSTRACT

Provided is an encoder apparatus that is free from battery maintenance or has low frequency of battery maintenance. The encoder apparatus includes: a position detection system including: a scale; a light emitter that irradiates the scale with light; a light detector that changes a relative position thereof with the scale in response to movement of a mover; and a detector that detects position information on the mover based on a detection result of the light detector. The encoder apparatus also includes an electric signal generator that generates an electric signal in response to the movement of the mover; and a light emission adjuster that adjusts emission of light from the light emitter based on the electric signal.

18 Claims, 17 Drawing Sheets

(51) Int. Cl.
  *G01D 5/244* (2006.01)
  *G01D 5/56* (2006.01)
  *G01D 5/14* (2006.01)
  *G01D 5/58* (2006.01)
(52) U.S. Cl.
  CPC ......... *G01D 5/34715* (2013.01); *G01D 5/145* (2013.01); *G01D 5/56* (2013.01); *G01D 5/58* (2013.01)

(56) References Cited

U.S. PATENT DOCUMENTS

| | | | |
|---|---|---|---|
| 2008/0197838 A1 | 8/2008 | Fischer | |
| 2010/0078548 A1* | 4/2010 | Fujita | G01D 5/34715 250/229 |
| 2011/0202308 A1* | 8/2011 | Kishida | G01D 5/2449 702/151 |
| 2014/0009043 A1* | 1/2014 | Watanabe | G01D 5/145 310/68 B |

FOREIGN PATENT DOCUMENTS

| | | |
|---|---|---|
| JP | H06-018281 A | 1/1994 |
| JP | H08-050034 A | 2/1996 |
| JP | H11-094594 A | 4/1999 |
| JP | 2005-156301 A | 6/2005 |
| JP | 2005-249571 A | 9/2005 |
| JP | 2010-085254 A | 4/2010 |
| JP | 2011-112381 A | 6/2011 |
| JP | 2012-008024 A | 1/2012 |
| JP | 2014-013163 A | 1/2014 |
| JP | 2015-206747 A | 11/2015 |
| JP | 2015-219096 A | 12/2015 |

OTHER PUBLICATIONS

Mar. 28, 2017 Written Opinon issued in International Patent Application PCT/JP2017/000285.
Jul. 10, 2019 extended Search Report issued in European Patent Application No. 17741219.4.
Mar. 13, 2019 Office Action issued in Japanese Patent Application No. 2017-562509.
Jan. 14, 2020 Office Action issued in Japanese Patent Application No. 2017-562509.
Dec. 24, 2019 Office Action issued in Chinese Patent Application No. 201780007728.9.
Oct. 27, 2020 Office Action issued in Chinese Patent Application No. 201780007728.9.
Apr. 30, 2021 Office Action issued in Chinese Patent Application No. 201780007728.9.
Dec. 7, 2021 Office Action issued in Japanese Patent Application No. 2020-180189.
May 24, 2022 Office Action issued in Japanese Patent Application No. 2020-180189.

\* cited by examiner

ENCODER APPARATUS, DRIVE APPARATUS, STAGE APPARATUS, AND ROBOT APPARATUS WITH LIGHT EMISSION ADJUSTER

CROSS REFERENCE TO RELATED APPLICATION

This is a Continuation of PCT Application No. PCT/JP2017/000285, filed on Jan. 6, 2017. The contents of the above-mentioned application are incorporated herein by reference.

FIELD OF THE INVENTION

The present invention relates to an encoder apparatus, a drive apparatus, a stage apparatus, and a robot apparatus.

BACKGROUND

A multi-rotation encoder apparatus that distinguishes the number of rotations of a shaft is mounted to various kinds of apparatuses including a robot apparatus (see, for example, Patent Literature 1). During operation of a robot apparatus, for example, the encoder apparatus is supplied with power from a main power supply in the robot apparatus, and detects rotation position information including multi-rotation information indicating the number of rotations and angular position information indicating an angular position within one rotation.

When the robot apparatus finishes predetermined processing, the main power supply in the robot apparatus may be turned off. In this case, the supply of power from the main power supply in the robot apparatus to the encoder apparatus is also stopped. The robot apparatus may need information such as the initial posture when the main power supply is next switched on, that is, the next operation is started. Thus, the encoder apparatus is required to hold multi-rotation information even in the state in which no power is supplied from the outside. To meet this requirement, such an encoder apparatus is used that holds multi-rotation information by power supplied from a battery in a state in which no power is obtained from the main power supply.

CITATION LIST

Patent Literature

[Patent Literature 1] Japanese Unexamined Patent Application Publication No. 8-50034

The encoder apparatus as described above is required to be free from maintenance of the battery (for example, replacement) or have low frequency of maintenance.

SUMMARY

A first aspect of the present invention provides an encoder apparatus including a position detection system including: a scale; a light emitter that irradiates the scale with light; a light detector that changes a relative position thereof with the scale in response to movement of a mover; and a detector that detects position information on the mover based on a detection result of the light detector. The encoder apparatus also includes an electric signal generator that generates an electric signal in response to the movement of the mover; and a light emission adjuster that adjusts emission of light from the light emitter based on the electric signal.

A second aspect of the present invention provides an encoder apparatus including: a detection system that optically detects position information on a scale and that changes a relative position thereof with the scale in response to movement of a mover; a signal generator that outputs a signal in response to the movement of the mover; and an adjuster that controls operation of the detection system based on the signal.

A third aspect of the present invention provides a drive apparatus including: the encoder apparatus in the first aspect or the second aspect; and a power supplier that supplies power to the mover.

A fourth aspect of the present invention provides a stage apparatus including: a moving object; and the drive apparatus in the third aspect that moves the moving object.

A fifth aspect of the present invention provides a robot apparatus including: the drive apparatus in the third aspect; and a first arm and a second arm that are relatively moved by the drive apparatus.

DETAILED DESCRIPTION OF EMBODIMENTS

First Embodiment

Figure 1:
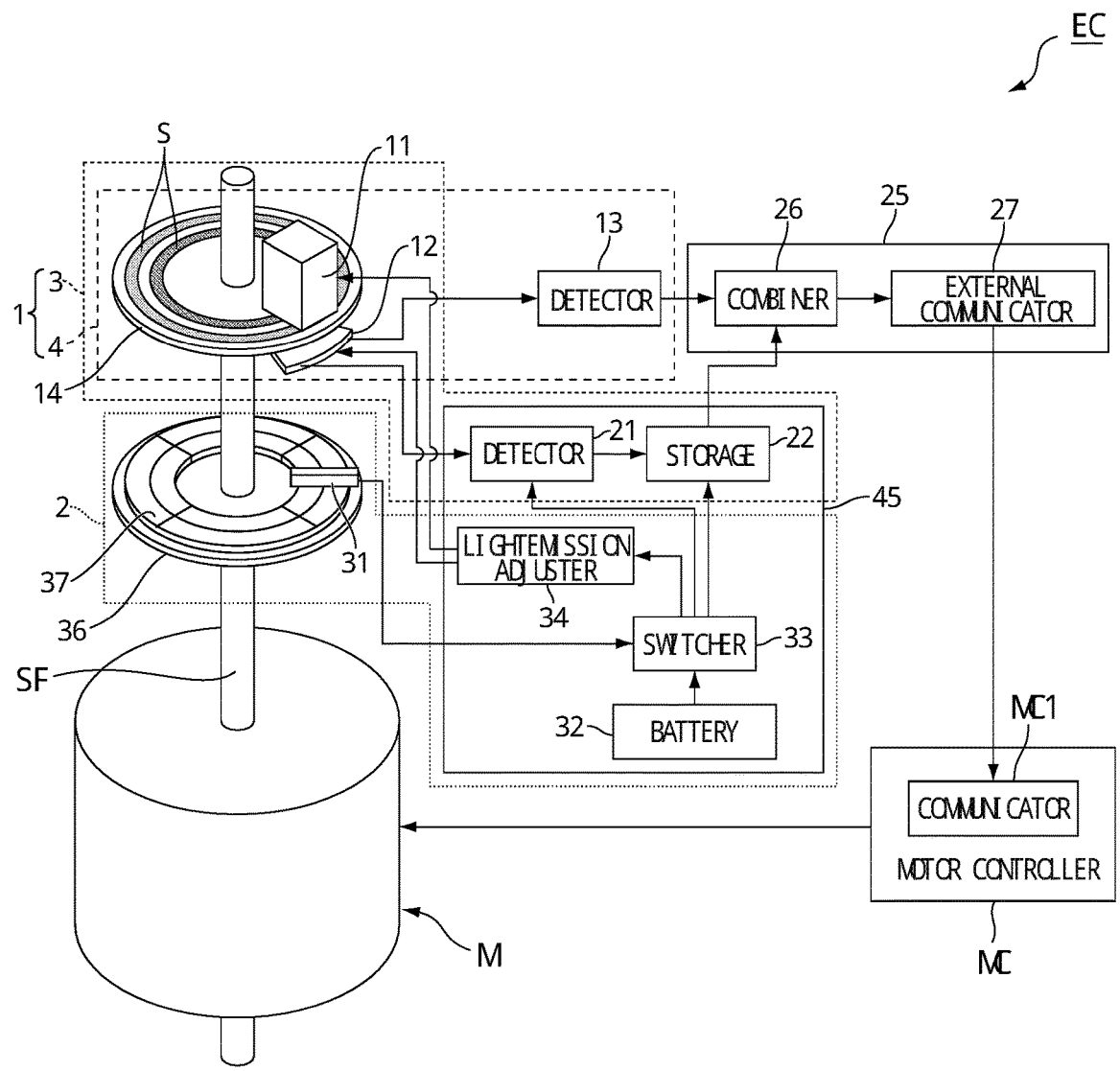
FIG. 1 is a diagram illustrating an encoder apparatus according to a first embodiment.

A first embodiment is described. FIG. 1 is a diagram illustrating an encoder apparatus EC according to the first embodiment. The encoder apparatus EC detects rotation position information on a rotation shaft SF (mover) of a motor M (power supplier). For example, the rotation shaft SF is a shaft (rotor) of the motor M, and may be an acting shaft (output shaft) which is connected to the shaft of the motor M through a power transmitter such as a transmission and which is connected to a load. Rotation position information detected by the encoder apparatus EC is supplied to a motor controller MC. The motor controller MC uses the rotation position information supplied from the encoder apparatus EC to control the rotation of the motor M. The motor controller MC controls the rotation of the rotation shaft SF.

The encoder apparatus EC includes a position detection system 1 and a power supply system 2. The position detection system 1 detects rotation position information on the rotation shaft SF. The encoder apparatus EC is what is called a multi-rotation absolute encoder, and detects rotation position information including multi-rotation information indicating the number of rotations of the rotation shaft SF and angular position information indicating an angular position (rotation angle) within one rotation. The encoder apparatus EC includes a multi-rotation information detector 3 to detect multi-rotation information on the rotation shaft SF and an angle detector 4 to detect the angular position of the rotation shaft SF.

For example, in a state in which an apparatus having the encoder apparatus EC mounted thereon (for example, a drive apparatus, a stage apparatus, a robot apparatus) is powered on, at least a part of the position detection system 1 (for example, the angle detector 4) operates by being supplied with power from the apparatus. For example, in a state in which the apparatus having the encoder apparatus EC mounted thereon is not powered on, at least a part of the position detection system 1 (for example, the multi-rotation information detector 3) operates by being supplied with power from the power supply system 2. For example, in a state in which the supply of power from the apparatus having the encoder apparatus EC mounted thereon is interrupted, the power supply system 2 intermittently supplies power to at least a part of the position detection system 1 (for example, the multi-rotation information detector 3), and the position detection system 1 detects at least a part of rotation position information (for example, multi-rotation information) on the rotation shaft SF when supplied with power from the power supply system 2.

For example, the angle detector 4 optically detects position information (angular position information) on a scale within one rotation. The angle detector 4 includes a light emitting element 11 (light emitter, irradiator), a scale S, a light receiving sensor 12 (light detector), and a detector 13. For example, the angle detector 4 detects the angular position within one rotation of the rotation shaft SF by a light receiving element reading patterning information on the scale S. For example, the patterning information on the scale S is represented by bright and dark slits on the scale S.

The scale S is provided a disc plate 14 fixed to the rotation shaft SF. The scale S includes an incremental scale and an absolute scale. The light emitting element 11 irradiates the scale S with light. The light receiving sensor 12 detects light that has been emitted from the light emitting element 11 and passed through the scale S. The relative positions of the light emitting element 11 and the light receiving sensor 12 with respect to the scale S change in response to the rotation (movement) of the rotation shaft SF (mover). In FIG. 1, the angle detector 4 is a transmissive detector, and the light receiving sensor detects light transmitted through the scale S. The light receiving sensor 12 includes a light receiver (not illustrated) that detects (receives) light that has passed through the incremental scale and a light receiver (not illustrated) that detects (receives) light that has passed through the absolute scale. The angle detector 4 may be a reflective detector. The light receiving sensor 12 supplies a signal indicating the detection result of the angular position information to the detector 13. For example, the detector 13 uses the result of detecting light from the absolute scale to detect the angular position with a first resolution. The detector 13 uses the result of detecting light from the incremental scale and performs interpolation on the angular position with the first resolution to detect the angular position with a second resolution that is higher than the first resolution.

Figure 2:
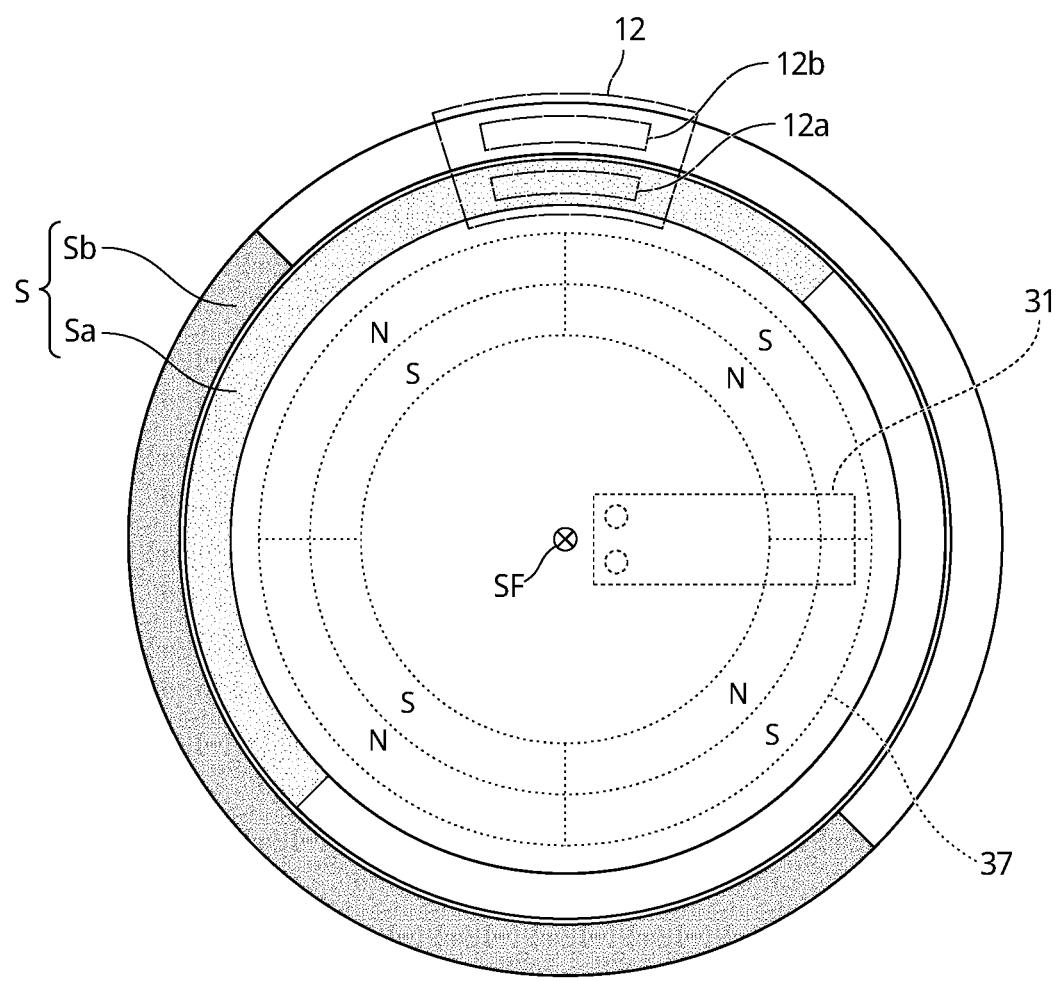
FIG. 2 is a diagram illustrating an example of a scale and a light receiving sensor according to the embodiment.

FIG. 2 is a diagram illustrating the scale S and the light receiving sensor 12 according to the first embodiment. In FIG. 2, parts used to detect multi-rotation information are illustrated, and the illustration of parts used to detect angular position information (incremental scale, absolute scale, and corresponding light receivers) is omitted. The scale S includes a first scale Sa and a second scale Sb. The first scale Sa and the second scale Sb are ring-shaped members centered at the rotation shaft SF. Optical characteristics (for example, transmissivity, reflectively, and light absorptivity) of the first scale Sa and the second scale Sb change depending on angular positions in the circumferential direction. For example, the optical characteristics of the first scale Sa and the second scale Sb are switched in a binary manner in the circumferential direction with respect to the rotation shaft SF. Angular positions at which the optical characteristics of the first scale Sa and the second scale Sb are switched in a binary manner are set to be different from angular positions of the boundaries between the N poles and the S poles in the circumferential direction of the magnet 37. The second scale Sb is similar to the first scale Sa, but the phase at which the optical characteristics change in the circumferential direction is different from that of the first scale Sa. A phase difference in optical characteristics between the first scale Sa and the second scale Sb is set to the range from more than 0° to less than 180°, and is set to, for example, 90°. The first scale Sa and the second scale Sb may be provided on a member that is different from the incremental scale and the absolute scale, and, for example, may be provided on the disc plate 15 similarly to the magnet 37. In this case, for example, light emitting elements that irradiate the first scale Sa and the second scale Sb with light are provided separately from light emitting elements that irradiate the incremental scale and the absolute scale with light.

The light receiving sensor 12 includes a first light receiver 12a and a second light receiver 12b. The first light receiver 12a is disposed at a position through which light that has been emitted from the light emitting element to pass through the first scale Sa (for example, transmitted, reflected) enters. For example, the transmissivity of the first scale Sa changes in the circumferential direction. The amount of light that has been emitted from the light emitting element 11 to be transmitted through the first scale Sa changes in accordance with the angular position of the first scale Sa (rotation shaft SF), and the amount of light entering the first light receiver 12a also changes in accordance with the angular position of the first scale Sa (rotation shaft SF).

The second light receiver 12b is disposed at a position through which light that has been emitted from the light emitting element 11 to pass through the second scale Sb (for example, transmitted, reflected) enters. For example, the second light receiver 12b is disposed at substantially the same angular position as that of the first light receiver 12a in the circumferential direction of the scale S. For example, the transmissivity of the second scale Sb changes in the circumferential direction. The amount of light that has been emitted from the light emitting element 11 to be transmitted through the second scale Sb changes in accordance with the angular position of the second scale Sb (rotation shaft SF), and the amount of light entering the second light receiver 12b also changes in accordance with the angular position of the second scale Sb (rotation shaft SF).

The first scale Sa and the second scale Sb have a phase difference of optical characteristics, and hence, for example, the detector 13 is capable of using detection results of the first light receiver 12a for an A-phase signal and using detection results of the second light receiver 12b for a B-phase signal. In FIG. 2, the phase of change in optical characteristics is different between the first scale Sa and the second scale Sb, and the angular positions of the first light receiver 12a and the second light receiver 12b are substantially the same. However, the phase of change in optical characteristics may be the same between the first scale Sa and the second scale Sb, and the angular positions of the first light receiver 12a and the second light receiver 12b may be different. Also in this case, the detector 13 is capable of using detection results of the first light receiver 12a for an A-phase signal and using detection results of the second light receiver 12b for a B-phase signal.

In the description with reference to FIG. 1, the detector 13 in the angle detector 4 may use detection results of the first light receiver 12a and the second light receiver 12b in the light receiving sensor 12 to detect the angular position of the rotation shaft SF.

The multi-rotation information detector 3 optically detects multi-rotation information on the rotation shaft SF, which is the same detection target as that of the angle detector 4. The multi-rotation information detector 3 includes the light emitting element 11 (light emitter), the scale S, the light receiving sensor 12 (light detector), a detector 21, and a storage 22. At least some of the light emitting element 11, the scale S, and the light receiving sensor 12 may be shared by the multi-rotation information detector 3 and the angle detector 4. The detector 21 uses detection results of the light receiving sensor 12 to detect multi-rotation information on the rotation shaft SF. For example, when the rotation shaft SF rotates in a predetermined direction and a predetermined position on the scale S passes a detection position of the light receiving sensor 12, the detector 21 adds (increments) 1 to the number of rotations. For example, when the rotation shaft SF rotates in a direction opposite to the predetermined direction and the predetermined position on the scale S passes the detection position of the light receiving sensor 12, the detector 13 subtracts (decrements) 1 from the number of rotations). The storage 22 stores therein the multi-rotation information detected by the detector 21.

In the first embodiment, the encoder apparatus EC includes a signal processor 25. The signal processor 25 processes the detection results of the position detection system 1. The signal processor 25 includes a combiner 26 and an external communicator 27. The combiner 26 acquires angular position information with a second resolution detected by the detector 13. The combiner 26 acquires multi-rotation information on the rotation shaft SF from the storage 22 in the multi-rotation information detector 3. The combiner 26 combines the angular position information from the detector 13 and the multi-rotation information from the multi-rotation information detector 3 to calculate rotation position information. For example, when the detection result of the detector 13 is θ [rad] and the detection result of the multi-rotation information detector 3 is n rotations, the combiner 26 calculates (2π×n+θ) as rotation position information. The rotation position information may be a pair of multi-rotation information and angular position information within one rotation.

The combiner 26 supplies the rotation position information to the external communicator 27. The external communicator 27 is connected to a communicator MC1 in the motor controller MC communicably in a wired or wireless manner. The external communicator 27 supplies rotation position information in a digital form to the communicator MC1 in the motor controller MC. The motor controller MC decodes the rotation position information from the external communicator 27 in the angle detector 4 as necessary. The motor controller MC uses the rotation position information to control power (drive power) supplied to the motor M, thereby controlling the rotation of the motor M.

The power supply system 2 includes an electric signal generation unit 31, a battery 32 (cell), a switcher 33, and a light emission adjuster 34. The electric signal generation unit 31 generates an electric signal in response to the rotation of the rotation shaft SF. For example, the electric signal includes a waveform whose power (current, voltage) temporally changes. For example, the electric signal generation unit 31 generates power as an electric signal by a magnetic field that changes in response to the rotation of the rotation shaft SF. For example, a disc plate 36 is provided on the rotation shaft SF, and a magnet is provided on the disc plate 36. The relative positions (relative angular positions) of the magnet 37 and the electric signal generation unit 31 change in response to the rotation of the rotation shaft SF, and the magnetic field formed at the position of the electric signal generation unit 31 is changed by the magnet 37.

Figure 3A:
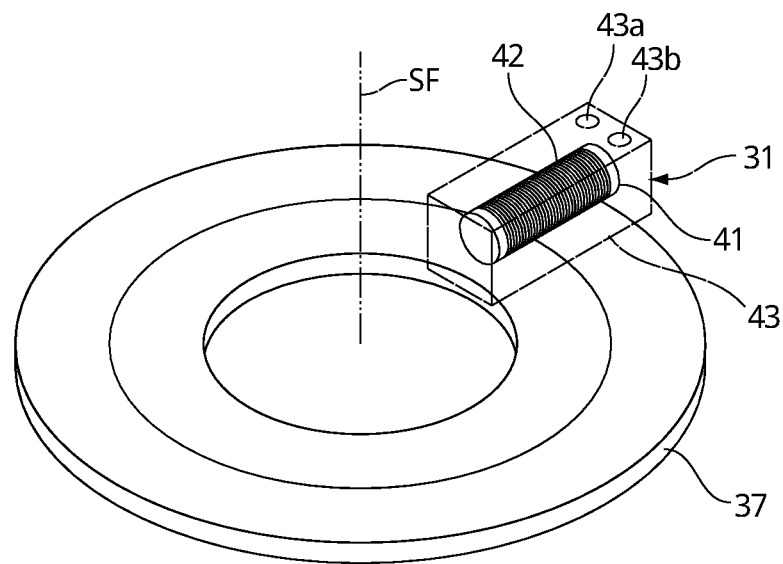
FIG. 3A and FIG. 3B include diagrams illustrating an example of a magnet and an electric signal generation unit according to the embodiment.
Figure 3B:
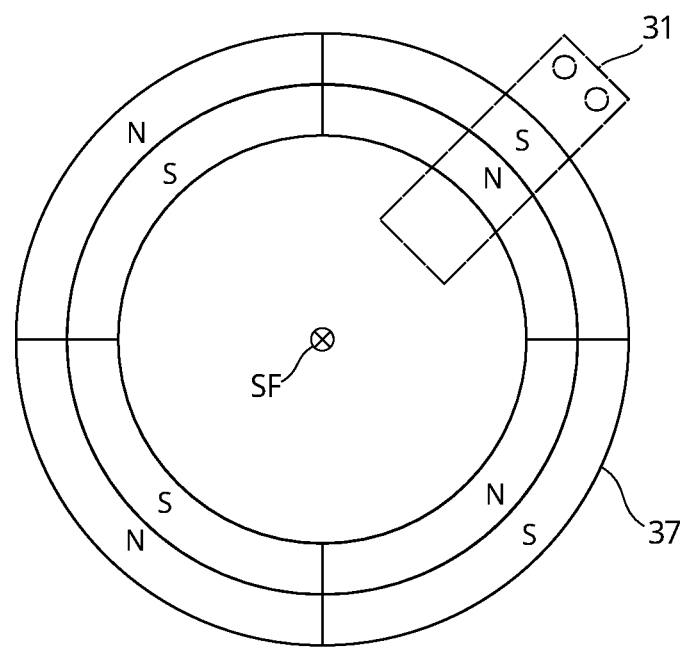

FIG. 3A and FIG. 3B include diagrams illustrating the magnet 37 and the electric signal generation unit 31 according to the first embodiment. FIG. 3A is a perspective view, and FIG. 3B is a plan view as seen from the direction of the rotation shaft SF.

The magnet 37 is configured such that the orientation and intensity of the magnetic field in the radiation direction (radial direction) with respect to the rotation shaft SF change in response to the rotation. For example, the magnet 37 is an annular member that is coaxial with the rotation shaft SF. Principal surfaces (front surface and rear surface) of the magnet 37 are substantially perpendicular to the rotation shaft SF. As illustrated in FIG. 3B, for example, the magnet 37 is a permanent magnet magnetized with eight poles. The magnet 37 has a shape obtained by combining two concentric ring-shaped magnets. Each of the two ring-shaped magnets is magnetized with four poles, and N poles and S poles are alternately disposed in the circumferential direction thereof. In the two ring-shaped magnets, the N poles and the S poles are arranged in the radial direction thereof (radiation direction of rotation shaft SF). In regard to a coordinate system fixed outside the magnet 37, the magnet 37 forms an AC magnetic field whose orientation in the radial direction is inverted in response to the rotation of the magnet 37. The electric signal generation unit 31 is disposed at a position overlapping with the magnet 37 when viewed from the normal direction to the principal surfaces of the magnet 37.

For the sake of description, the rotation in the counterclockwise direction and the rotation in the clockwise direction when viewed from the distal end side of the rotation shaft SF (side opposite to the motor M in FIG. 1) are referred to as "forward rotation" and "reverse rotation", respectively. Angles in the forward rotation are represented by positive values, and angles in the reverse rotation are represented by negative values. The rotation in the counterclockwise direction and the rotation in the clockwise direction when viewed from the base end side of the rotation shaft SF (side of the motor M in FIG. 1) may be defined as "forward rotation" and "reverse rotation", respectively.

In the first embodiment, the electric signal generation unit 31 is provided not in contact with the magnet 37. The electric signal generation unit 31 includes a magnetosensor 41 and a generator 42. The magnetosensor and the generator 42 are fixed to the outside of the magnet 37, and the relative positions thereof with respect to positions on the magnet 37 change in response to the rotation of the magnet 37.

The magnetosensor 41 is a magnetosensitive wire, such as a Wiegand wire. In the magnetosensor 41, large Barkhausen jump (Wiegand effect) is produced by a change in the magnetic field caused by the rotation of the magnet 37. The magnetosensor 41 is a columnar member, and its axial direction is set to the radial direction of the magnet 37. In the magnetosensor 41, when an AC magnetic field is applied in the axial direction thereof and the magnetic field is inverted, a magnetic domain wall from one end to the other end of the magnetosensor 41 in the axial direction is generated.

The generator 42 is for example a high-density coil disposed and wound around the magnetosensor 41. In the generator 42, electromagnetic induction is caused by the generation of the magnetic domain wall in the magnetosensor 41, and an induced current flows. When the orientation of the magnetic field formed at the position of the magnetosensor 41 by the magnet 37 is inverted, a pulsed current (electric signal) is generated in the generator 42. The electric signal is used to switch between conduction and interruption in a circuit included in the position detection system 1.

The orientation of the current generated in the generator 42 changes in accordance with the orientations of the magnetic fields before and after the inversion. For example, the orientation of a current generated when the magnetic field facing the outer side of the magnet 37 is inverted to the magnetic field facing the inner side of the magnet 37 is opposite to the orientation of a current generated when the magnetic field facing the inner side of the magnet 37 is inverted to the magnetic field facing the outer side of the magnetic field. Power (induced current) generated in the generator 42 is able to be set by, for example, the number of windings of the high-density coil.

As illustrated in FIG. 3A, the magnetosensor 41 and the generator 42 are housed in a case 43. The case 43 is provided with a terminal 43a and a terminal 43b. The high-density coil in the generator 42 has one end electrically connected to the terminal 43a and the other end electrically connected to the terminal 43b. Power generated in the generator 42 is able to be extracted to the outside of the electric signal generation unit 31 through the terminal 43a and the terminal 43b.

The scale S illustrated in FIG. 1 may be provided on the disc plate 36, or may be a member integrated with the disc plate 36. For example, the scale S may be provided on a surface of the disc plate 36 on the side opposite to the magnet 37. The scale S may be provided on at least one of the inner side and the outer side of the magnet 37.

Referring back to FIG. 1, the battery 32 supplies at least a part of the power consumed by the position detection system 1 in accordance with the electric signal generated by the electric signal generation unit 31. The battery 32 is a primary cell such as a button cell and a dry cell. For example, the battery 32 is a button cell, and is held in the holder 45. For example, the holder 45 is a circuit board on which at least a part of the position detection system 1 is provided. For example, the holder 45 holds the detector 21, the switcher 33, and the storage 22. In the holder 45, for example, a batter case capable of housing the battery 32 and electrodes and wiring connected to the battery 32 are provided.

The switcher 33 switches between supply and no supply of power from the battery 32 to the position detection system 1 in accordance with the electric signal generated by the electric signal generation unit 31. For example, the switcher 33 initiates supply of power from the battery 32 to the position detection system 1 when the level of the electric signal generated by the electric signal generation unit 31 becomes equal to or higher than a threshold. For example, the switcher 33 initiates supply of power from the battery 32 to the position detection system 1 when power equal to or higher than a threshold is generated by the electric signal generation unit 31. The switcher 33 stops causing the supply of power from the battery 32 to the position detection system 1 when the level of the electric signal generated by the electric signal generation unit 31 becomes lower than the threshold. For example, the switcher 33 stops causing the supply of power from the battery 32 to the position detection system 1 when power generated by the electric signal generation unit 31 becomes lower than the threshold. For example, when a pulsed electric signal is generated in the electric signal generation unit 31, the switcher 33 initiates supply of power from the battery 32 to the position detection system 1 upon the rising of level (power) of the electric signal from Low level to High level, and stops causing the supply of power from the battery 32 to the position detection system 1 after a predetermined time has elapsed since the level (power) of the electric signal changed to Low level.

The light emission adjuster 34 adjusts light emitted from the light emitting element 11 (light emitter) based on the electric signal generated by the electric signal generation unit 31. For example, the light emission adjuster 34 adjusts timing at which light is emitted from the light emitting element 11. For example, the light emission adjuster 34 uses the electric signal generated by the electric signal generation unit 31 to switch between a turned-on state and a turned-off state of the light emitting element 11. For example, by switching between supplying and not supplying power to the light emitting element 11, the light emission adjuster 34 adjusts the timing at which light is emitted from the light emitting element 11 (light emitter). The light emission adjuster 34 is provided in a power supply path between the switcher 33 and the light emitting element 11. For example, the light emission adjuster 34 is electrically connected to the switcher 33, and is capable of being supplied with power from the switcher 33. The light emission adjuster 34 is electrically connected to the light emitting element 11, and is capable of supplying the light emitting element 11 with power necessary for the light emitting element 11 to maintain the turned-on state. For example, the light emission adjuster 34 initiates supply of power to the light emitting element 11, triggered by the supply of power from the switcher 33 in accordance with the electric signal generated by the electric signal generation unit 31. For example, when power is supplied from the switcher 33, the light emission adjuster 34 causes the supply of power to the light emitting element 11 to turn on the light emitting element 11. In this manner, the light emission adjuster 34 uses the electric signal generated by the electric signal generation unit 31 to start the emission of light from the light emitting element 11. The light emission adjuster 34 may adjust the intensity (light emission amount) of light emitted from the light emitting element 11 (light emitter). For example, after the light emitting element 11 emits light with a predetermined light amount in a predetermined period, the light emission adjuster 34 may decrease the amount of light emitted from the light emitting element 11 from the predetermined light amount. The light emission adjuster 34 may adjust the timing and light emission amount of light emitted from the light emitting element 11. For example, the light emission adjuster 34 may use the electric signal generated by the electric signal generation unit 31 to adjust the light emission amount of the light emitting element 11.

In the first embodiment, the light emission adjuster 34 may adjust timing at which the light receiving sensor 12 performs detection operation based on the electric signal generated by the electric signal generation unit 31. For example, the light emission adjuster 34 uses the electric signal generated by the electric signal generation unit 31 to switch between a detection period during which the light receiving sensor 12 performs detection operation and a non-detection period during which the light receiving sensor 12 does not perform detection operation. For example, the light emission adjuster 34 switches between the detection period and the non-detection period during which the detection operation is not performed by switching between supplying and not supplying power to the light receiving sensor 12. The light emission adjuster 34 is provided in a power supply path between the switcher 33 and the light receiving sensor 12. For example, the light emission adjuster 34 is electrically connected to the light receiving sensor 12, and is capable of supplying the light receiving sensor 12 with power necessary for the light receiving sensor 12 to detect light (perform detection operation). For example, the light emission adjuster 34 starts the detection period of the light receiving sensor 12, triggered by the supply of power from the switcher 33 in accordance with the electric signal generated by the electric signal generation unit 31. For example, when power is supplied from the switcher 33, the light emission adjuster 34 causes the supply of power to the light receiving sensor 12, such that the light receiving sensor 12 is capable of performing the detection operation. The light emission adjuster 34 is not necessarily required to adjust the timing at which the light receiving sensor 12 performs detection operation. For example, the light receiving sensor 12 may perform detection operation by being supplied with power not via the light emission adjuster 34.

For example, the light emission adjuster 34 stops causing the emission of light from the light emitting element 11 after the light receiving sensor 12 detects light from the scale S. For example, the light emission adjuster 34 stops causing the emission of light from the light emitting element 11 after a predetermined time has elapsed since the start of the emission of light from the light emitting element 11 (triggered by the lapse of a predetermined time). For example, the predetermined time is set in advance to be equal to or longer than a time that allows the light receiving sensor 12 to perform detection operation. For example, after the predetermined time has elapsed since the start of the supply of power to the light emitting element 11, the light emission adjuster 34 stops causing the supply of power to the light emitting element 11 to set the light emitting element 11 to the turned-off state. For example, the light emission adjuster 34 may switch to the non-detection period of the light receiving sensor 12 after a predetermined time has elapsed since the start of the detection period of the light receiving sensor 12. For example, triggered by the lapse of the predetermined time since the start of the supply of power to the light receiving sensor 12, the light emission adjuster 34 may stop causing the supply of power to the light receiving sensor 12 to set the light receiving sensor to the state in which the detection operation is not performed. For example, the length of the period during which light is emitted from the light emitting element 11 is equal to or shorter than the length of the period during which power is supplied to the position detection system 1 based on the electric signal generated by the electric signal generation unit 31. For example, the period during which light is emitted from the light emitting element 11 is a part of the period during which a circuit included in the position detection system is conductive based on the electric signal generated by the electric signal generation unit 31. For example, the period from when the light emitting element 11 becomes the turned-on state to when the light emitting element 11 becomes the turned-off state is a part of the period during which the electric signal is generated by the electric signal generation unit 31. When a pulsed electric signal is generated by the electric signal generation unit 31, the period during which the electric signal is generated is, for example, the period from when generation of the pulsed electric signal starts (rising timing of pulse) to when generation of the electric signal stops (falling timing of pulse). The light emission adjuster 34 is not necessarily required to switch to the non-detection period. For example, the light receiving sensor 12 may perform detection operation by being supplied with power not via the light emission adjuster 34, and may become the state in which the detection operation is not performed when the supply of power is interrupted.

Figure 4:
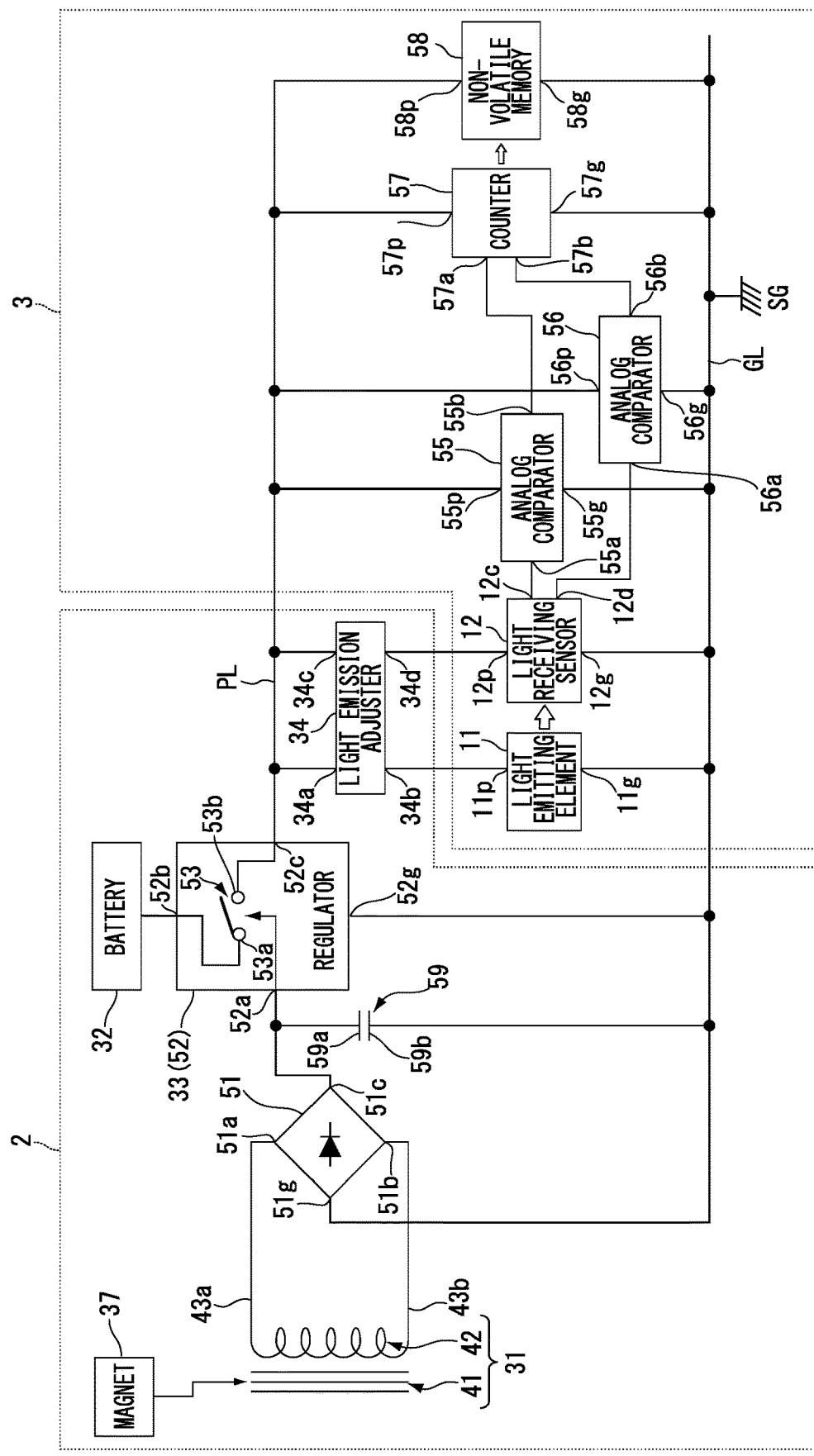
FIG. 4 is a diagram illustrating a circuit configuration of a power supply system and a multi-rotation information detector according to the first embodiment.

FIG. 4 is a diagram illustrating a circuit configuration of the power supply system 2 and the multi-rotation information detector 3 according to the first embodiment. The power supply system 2 includes an electric signal generation unit 31, a rectifier stack 51, and a battery 32. The power supply system 2 includes a regulator 52 as the switcher 33 illustrated in FIG. 1.

The rectifier stack 51 is a rectifier to rectify a current flowing from the electric signal generation unit 31. The rectifier stack 51 has a first input terminal 51*a* connected to a terminal 43*a* of the electric signal generation unit 31. The rectifier stack 51 has a second input terminal 51*b* connected to a terminal 43*b* of the electric signal generation unit 31. The rectifier stack 51 has a ground terminal 51*g* connected to a ground line GL that is supplied with the same potential as the signal ground SG. When the multi-rotation information detector 3 operates, the potential of the ground line GL serves as a reference potential of the circuit. The rectifier stack 51 has an output terminal 51*c* connected to a control terminal 52*a* of the regulator 52.

The regulator 52 adjusts power supplied from the battery 32 to the position detection system 1. The regulator 52 may include a switch 53 provided in a power supply path between the battery 32 and the position detection system 1. The regulator 52 controls the operation of the switch 53 based on an electric signal generated by the electric signal generation unit 31.

The regulator 52 has an input terminal 52*b* connected to the battery 32. The regulator 52 has an output terminal 52*c* connected to a power supply line PL. The regulator 52 has a ground terminal 52*g* connected to the ground line GL. The control terminal 52*a* of the regulator 52 is an enable terminal. The regulator 52 maintains the potential of the output terminal 52*c* to a predetermined voltage in the state in which a voltage of a threshold or more is applied to the control terminal 52*a*. For example, an output voltage (the above-mentioned predetermined voltage) of the regulator 52 is 3 V when the counter 57 (described later) is formed of a CMOS. For example, an operating voltage of the storage 22 (non-volatile memory 58 described later) is set to the same voltage as the predetermined voltage. The predetermined voltage is a voltage necessary for the supply of power, and may be not only a constant voltage value but also a voltage that gradually changes.

In the switch 53, a first terminal 53a is connected to the input terminal 52b, and a second terminal 53b is connected to the output terminal 52c. The regulator 52 uses an electric signal supplied from the electric signal generation unit 31 to the control terminal 52a as a control signal (enable signal) to switch between a conductive state (ON) and an insulated state (OFF) of the first terminal 53a and the second terminal 53b of the switch 53. For example, the switch 53 includes a switching element such as a MOS and a TFT. The first terminal 53a and the second terminal 53b are a source electrode and a drain electrode, and a gate electrode is connected to the control terminal 52a. In the switch 53, the gate electrode is charged with an electric signal (power) generated by the electric signal generation unit 31, and when the potential of the gate electrode becomes equal to or higher than a threshold, the source electrode and the drain electrode become conductive (ON state). The switch 53 may be provided outside the regulator 52, and, for example, may be an external relay.

A first input terminal 34a of the light emission adjuster 34 is connected to the power supply line PL. A first output terminal 34b of the light emission adjuster 34 is connected to a power supply terminal 11p of the light emitting element 11. A ground terminal 11g of the light emitting element 11 is connected to the ground line GL. The light emitting element 11 emits light by power supplied from the power supply system 2 through the power supply terminal 11p and the ground terminal 11g. The light emission adjuster 34 sets the conductive state (ON) between the first input terminal 34a and the first output terminal 34b when the first input terminal 34a (power supply line PL) has a predetermined potential, and sets the insulated state (OFF) between the first input terminal 34a and the first output terminal 34b after a predetermined time has elapsed. When the state between the first input terminal 34a and the first output terminal 34b is conductive, the light emission adjuster 34 causes the supply of power to the light emitting element 11. When the state between the first input terminal 34a and the first output terminal 34b is insulated, the light emission adjuster 34 does not cause the supply of power to the light emitting element 11.

A second input terminal 34c of the light emission adjuster 34 is connected to the power supply line PL. A second output terminal 34d of the light emission adjuster 34 is connected to a power supply terminal 12p of the light receiving sensor 12. A ground terminal 12g of the light receiving sensor 12 is connected to the ground line GL. The light receiving sensor 12 detects light by power supplied from the power supply system 2 through the power supply terminal 12p and the ground terminal 12g. A first output terminal 12c of the light receiving sensor 12 outputs a detection result of the first light receiver 12a illustrated in FIG. 2. A second output terminal 12d of the light receiving sensor 12 outputs a detection result of the second light receiver 12b illustrated in FIG. 2. The light emission adjuster 34 sets the conductive state (ON) between the second input terminal 34c and the second output terminal 34d when the second input terminal 34c (power supply line PL) has a predetermined potential, and sets the insulated state (OFF) between the second input terminal 34c and the second output terminal 34d after a predetermined time has elapsed. When the state between the second input terminal 34c and the second output terminal 34d is conductive, the light emission adjuster 34 causes the supply of power to the light receiving sensor 12. When the state between the second input terminal 34c and the second output terminal 34d is insulated, the light emission adjuster 34 does not cause the supply of power to the light receiving sensor 12. The timing at which the light emission adjuster 34 initiates supply of power to the light receiving sensor 12 may be the same as or different from the timing at which the light emission adjuster 34 initiates supply of power to the light emitting element 11.

The multi-rotation information detector 3 includes an analog comparator 55, an analog comparator 56, and a counter 57 as the detector 21 illustrated in FIG. 1.

The analog comparator 55 is a comparator that compares a voltage output from the first light receiver 12a in the light receiving sensor 12 with a predetermined voltage. A power supply terminal 55p of the analog comparator 55 is connected to the power supply line PL. A ground terminal 55g of the analog comparator 55 is connected to the ground line GL. An input terminal 55a of the analog comparator 55 is connected to the first output terminal 12c of the light receiving sensor 12. An output terminal 55b of the analog comparator 55 is connected to a first input terminal 57a of the counter 57. The analog comparator 55 outputs a signal of H level from the output terminal 55b when the output voltage of the first light receiver 12a is equal to or higher than a threshold, and outputs a signal of L level from the output terminal 55b when the output voltage of the first light receiver 12a is lower than the threshold.

The analog comparator 56 is a comparator that compares a voltage output from the second light receiver 12b in the light receiving sensor 12 with a predetermined voltage. A power supply terminal 56p of the analog comparator 56 is connected to the power supply line PL. A ground terminal 56g of the analog comparator 56 is connected to the ground line GL. An input terminal 56a of the analog comparator 56 is connected to the second output terminal 12d of the light receiving sensor 12. An output terminal 56b of the analog comparator 56 is connected to a second input terminal 57b of the counter 57. The analog comparator 56 outputs a signal of H level from the output terminal 56b when the output voltage of the second light receiver 12b is equal to or higher than a threshold, and outputs a signal of L level from the output terminal 56b when the output voltage of the second light receiver 12b is lower than the threshold.

The counter 57 counts multi-rotation information on the rotation shaft SF by using power supplied from the battery 32. For example, the counter 57 includes a CMOS logic circuit. The counter 57 operates with use of power supplied through a power supply terminal 57p and a ground terminal 57g. The power supply terminal 57p of the counter 57 is connected to the power supply line PL. The ground terminal 57g of the counter 57 is connected to the ground line GL. The counter 57 performs counting processing by using a voltage supplied through the first input terminal 57a and a voltage supplied through the second input terminal 57b as control signals.

In the first embodiment, a non-volatile memory 58 is provided as the storage 22 illustrated in FIG. 1. The non-volatile memory 58 stores therein at least a part of the rotation position information detected by the detector 21 (for example, multi-rotation information) by using power supplied from the battery 32 (performs writing operation). The non-volatile memory 58 is capable of holding information written while being supplied with power even in the state in which no power is supplied. The non-volatile memory 58 stores therein the result of counting by the counter 57 (multi-rotation information) as rotation position information detected by the detector 21. A power supply terminal 58p of the non-volatile memory 58 is connected to the power supply line PL. A ground terminal 58g of the non-volatile memory 58 is connected to the ground line GL.

In the first embodiment, a capacitor 59 is provided between the rectifier stack 51 and the regulator 52. A first electrode 59a of the capacitor 59 is connected to a signal line that connects the rectifier stack 51 and the control terminal 52a of the regulator 52. A second electrode 59b of the capacitor 59 is connected to the ground line GL. The capacitor 59 is what is called a smoothing capacitor, and reduces pulsation to reduce load on the regulator. For example, the constant of the capacitor 59 is set such that the supply of power from the battery 32 to the detector 21 and the storage 22 is maintained in a period from when the detector 21 detects rotation position information to when the rotation position information is written in the storage 22.

Figure 5:
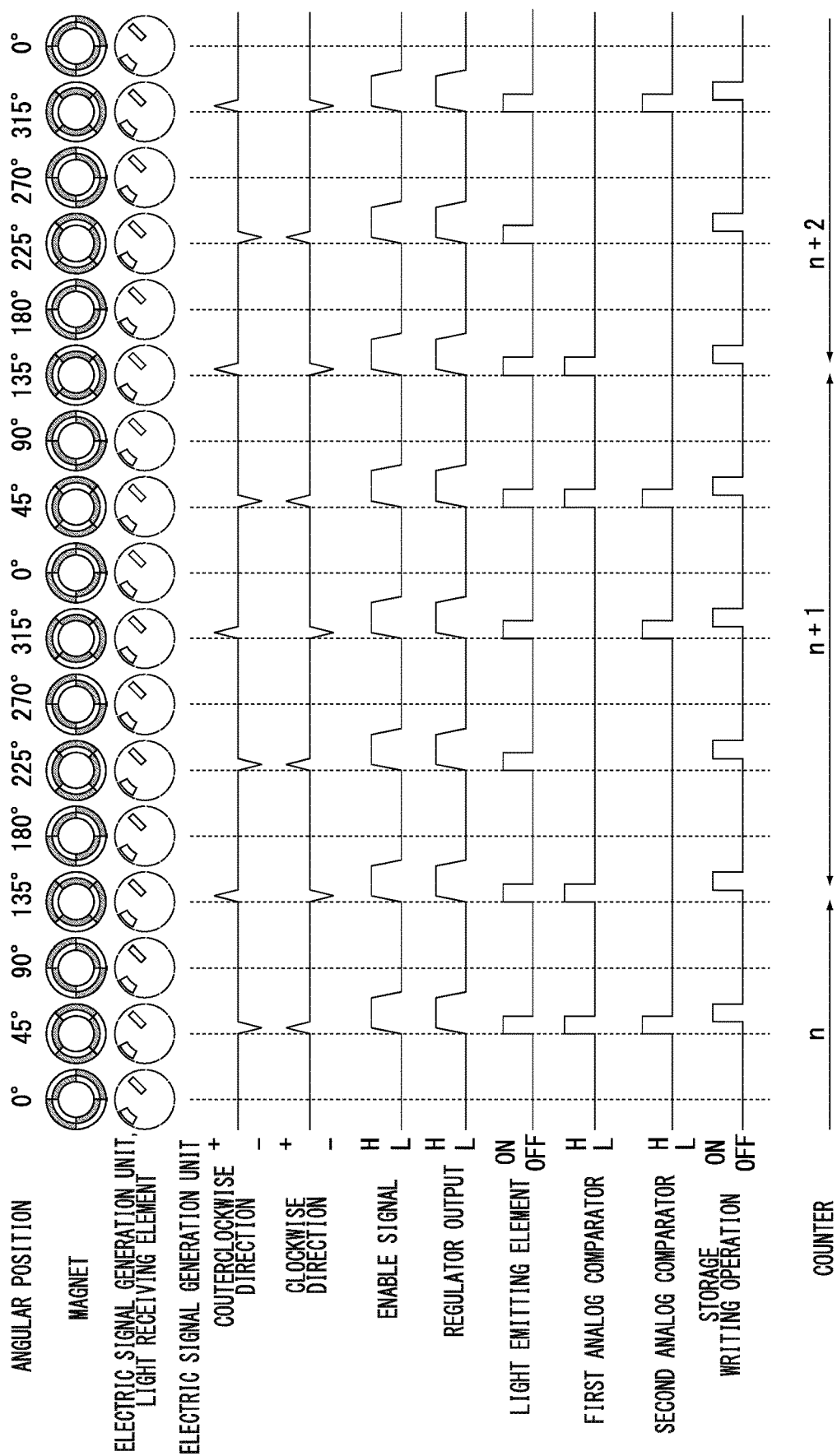
FIG. 5 is a diagram illustrating operation of the power supply system and the multi-rotation information detector according to the first embodiment.

FIG. 5 is a diagram illustrating the operation of the power supply system and the multi-rotation information detector according to the first embodiment. "MAGNET" in FIG. 5 represents the angular position of the magnet corresponding to the angular position of the rotation shaft SF, and N poles and S poles are illustrated by different types of hatching. "ELECTRIC SIGNAL GENERATION UNIT, LIGHT RECEIVING ELEMENT" represents the angular positions of the electric signal generation unit 31 and the light receiving sensor 12, which are constant irrespective of the angular position of the rotation shaft SF. "ELECTRIC SIGNAL GENERATION UNIT" represents the output of the electric signal generation unit 31, and the output of a current flowing in one direction is positive (+) while the output of a current flowing in the reverse direction is negative (−). The output of the electric signal generation unit 31 when the rotation shaft SF rotates in the counterclockwise direction is indicated by "COUNTERCLOCKWISE DIRECTION", and the output of the electric signal generation unit 31 when the rotation shaft SF rotates in the clockwise direction is indicated by "CLOCKWISE DIRECTION". "ENABLE SIGNAL" represents the potential applied to the control terminal 52a of the regulator 52 in response to the electric signal generated by the electric signal generation unit 31, and High level is represented by "H" while Low level is represented by "L". "REGULATOR" represents the output of the regulator 52, and High level is represented by "H" while Low level is represented by "L".

"FIRST OUTPUT OF LIGHT RECEIVING ELEMENT" and "SECOND OUTPUT OF LIGHT RECEIVING ELEMENT" in FIG. 5 represent the output of the first light receiver 12a and the output of the second light receiver 12b, respectively. "FIRST ANALOG COMPARATOR" and "SECOND ANALOG COMPARATOR" represent the outputs from the analog comparator 55 and the analog comparator 56, respectively.

The sign of the output of the electric signal generation unit 31 is reversed depending on the rotation direction of the rotation shaft SF, but the rectifier stack rectifies the current from the electric signal generation unit 31, and hence the enable signal is the same between the case where the rotation shaft SF rotates in the counterclockwise direction and the case where the rotation shaft SF rotates in the clockwise direction. The enable signal rises to High level (H) at angular positions of 45°, 135°, 225°, and 315°. The output of the regulator 52 becomes High level (H) in response to the rising of the enable signal. When the output of the regulator 52 becomes High level, power is supplied to the light emitting element and the light receiving sensor 12. Then, the light emitting element 11 irradiates the scale S with light, and the light receiving sensor 12 detects light that has been emitted from the light emitting element 11 to pass through the scale S. A pair of the output of the analog comparator and the output of the analog comparator 56 are represented by (0,1), where "1" is H and "0" is L. Pairs of the output of the analog comparator 55 and the output of the analog comparator 56 are (1,1), (1,0), (0,0), and (0,1) at angular positions 45°, 135°, 225°, and 315°, respectively. Thus, the four angular positions are distinguishable based on the pairs of the output of the analog comparator 55 and the output of the analog comparator 56. The counter 57 uses the output of the analog comparator 55 and the output of the analog comparator 56 to detect multi-rotation information on the rotation shaft SF. For example, when the above-mentioned pair of outputs are (1,1) in the previous detection and (1,0) in the current detection, it is understood that the angular position has changed from 45° to 135°. For example, when the above-mentioned pair of outputs have changed from (1,1) to (1,0), the counter 57 increases the counter by 1, and when the above-mentioned pair of outputs have changed from (1,0) to (1,1), the counter 57 decreases the counter by 1. The storage 22 (non-volatile memory 58) stores therein multi-rotation information (counter value) detected by the counter 57.

Figure 6:
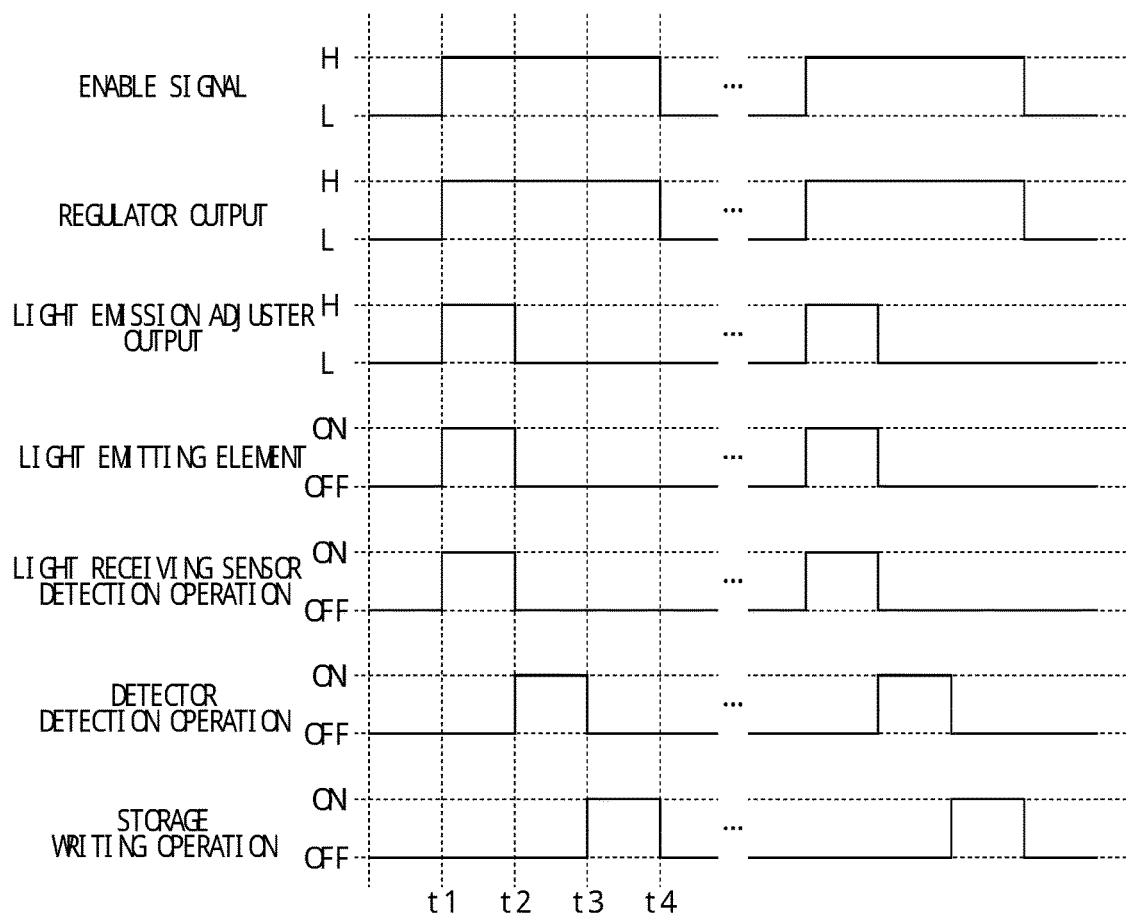
FIG. 6 is a diagram illustrating the operation timing of a light emitter and a light receiving element according to the embodiment.

FIG. 6 is a diagram illustrating the operation timing of the light emitter and the light receiving element according to the first embodiment. FIG. 6 conceptually illustrates the timing, with delays of signals ignored. At time t1, the level of the enable signal rises from L to H, and the output power of the regulator 52 is switched from L to H. At time t1, in response to the switching of the output power from the regulator 52 from L to H, the output power of the light emission adjuster 34 is switched from L to H. At time t1, the light emission adjuster 34 initiates supply of power to the light emitting element 11, and the state of the light emitting element 11 is switched from the turned-off state (represented by "OFF" in FIG. 6) to the turned-on state ("ON" in FIG. 6). At time t1, the light emission adjuster 34 initiates supply of power to the light receiving sensor 12, and the state of the light receiving sensor 12 (represented by "LIGHT RECEIVING ELEMENT" in FIG. 6) is switched from the state in which detection operation is not performed (represented by "OFF" in FIG. 6) to the state in which detection operation is performed ("ON" in FIG. 6). The light receiving sensor 12 detects light at a predetermined sampling frequency in the state in which detection operation is performed, and outputs the detection result to the detector 21 (see FIG. 1).

At time t2 after a predetermined period has elapsed since time t1, the output power of the light emission adjuster 34 is switched from H to L. At time t2, the light emission adjuster 34 stops causing the supply of power to the light emitting element 11, and the state of the light emitting element 11 is switched from the turned-on state ("ON") to the turned-off state ("OFF"). At time t2, the light emission adjuster 34 stops causing the supply of power to the light receiving sensor 12, and the state of the light receiving sensor 12 is switched from the state in which detection operation is performed ("ON") to the state in which detection operation is not performed ("OFF"). The detector 21 uses the detection result output from the light receiving sensor 12 to perform detection operation of multi-rotation information at time t2 or later. At time t3 after time t2, the detector 21 outputs the detection result of multi-rotation information to the storage 22. At time t3 or later, the storage 22 performs writing operation of the multi-rotation information output from the detector 21. At time t4 after time t3, the level of the enable signal falls from H to L, and the output of the regulator 52 falls from H to L. The storage 22 completes the writing of the multi-rotation information before time t4.

In this manner, for example, the light emission adjuster 34 stops causing the emission of light from the light emitting element 11 in at least a part of the period during which the multi-rotation information detector 3 (for example, the detector 21) operates. In this case, power consumption is able to be reduced to the extent that the light emitting element 11 is set to the turned-off state (light emission time is shortened), enabling the wear of the battery 32 to be suppressed. For example, the light emission adjuster 34 stops causing the emission of light from the light emitting element 11 in at least a part of the period during which the storage 22 writes the multi-rotation information. In this case, power consumption is able to be reduced to the extent that the light receiving sensor 12 does not perform detection operation, enabling the wear of the battery 32 to be suppressed. Consequently, the encoder apparatus EC is free from maintenance (for example, replacement) of the battery 32 or has low frequency of maintenance. For example, the light emission adjuster 34 may decrease the emission amount (emission intensity) of light from the light emitting element 11 in at least a part of the period during which the multi-rotation information detector 3 (for example, the detector 21) operates. In this case, in the period during which the multi-rotation information detector 3 (for example, the detector 21) operates, the case where the light emission amount is large and the case where the light emission amount is small are switched. In this case, power consumption is able to be reduced in the period during which the light emission amount of the light emitting element 11 is reduced, enabling the wear of the battery 32 to be suppressed. For example, the light emission adjuster 34 may decrease the emission amount (emission intensity) of light from the light emitting element 11 in at least a part of the period during which the storage 22 writes the multi-rotation information. In this case, power consumption is able to be reduced to the extent that the light receiving sensor 12 does not perform detection operation, enabling the wear of the battery 32 to be suppressed. Consequently, the encoder apparatus EC is free from maintenance (for example, replacement) of the battery 32 or has low frequency of maintenance.

In the above-mentioned embodiment, the light emission adjuster 34 stops causing the supply of power to the light emitting element 11 after a predetermined time has elapsed since the start of the supply of power to the light emitting element 11, but may adjust the timing of turning off the light emitting element 11 by using another trigger. For example, the light emission adjuster 34 may turn off the light emitting element 11 by using the output of the light receiving sensor 12 or a signal generated from the output of the light receiving sensor 12 as a trigger. For example, the light emission adjuster 34 may stop causing the supply of power to the light emitting element 11 when the signal has been output from the analog comparator 55 for a predetermined number of times. Alternatively, the light emission adjuster 34 may stop causing the supply of power to the light emitting element 11 when the signal (multi-rotation information) has been output from the counter 57 to the storage 22.

Second Embodiment

Figure 7:
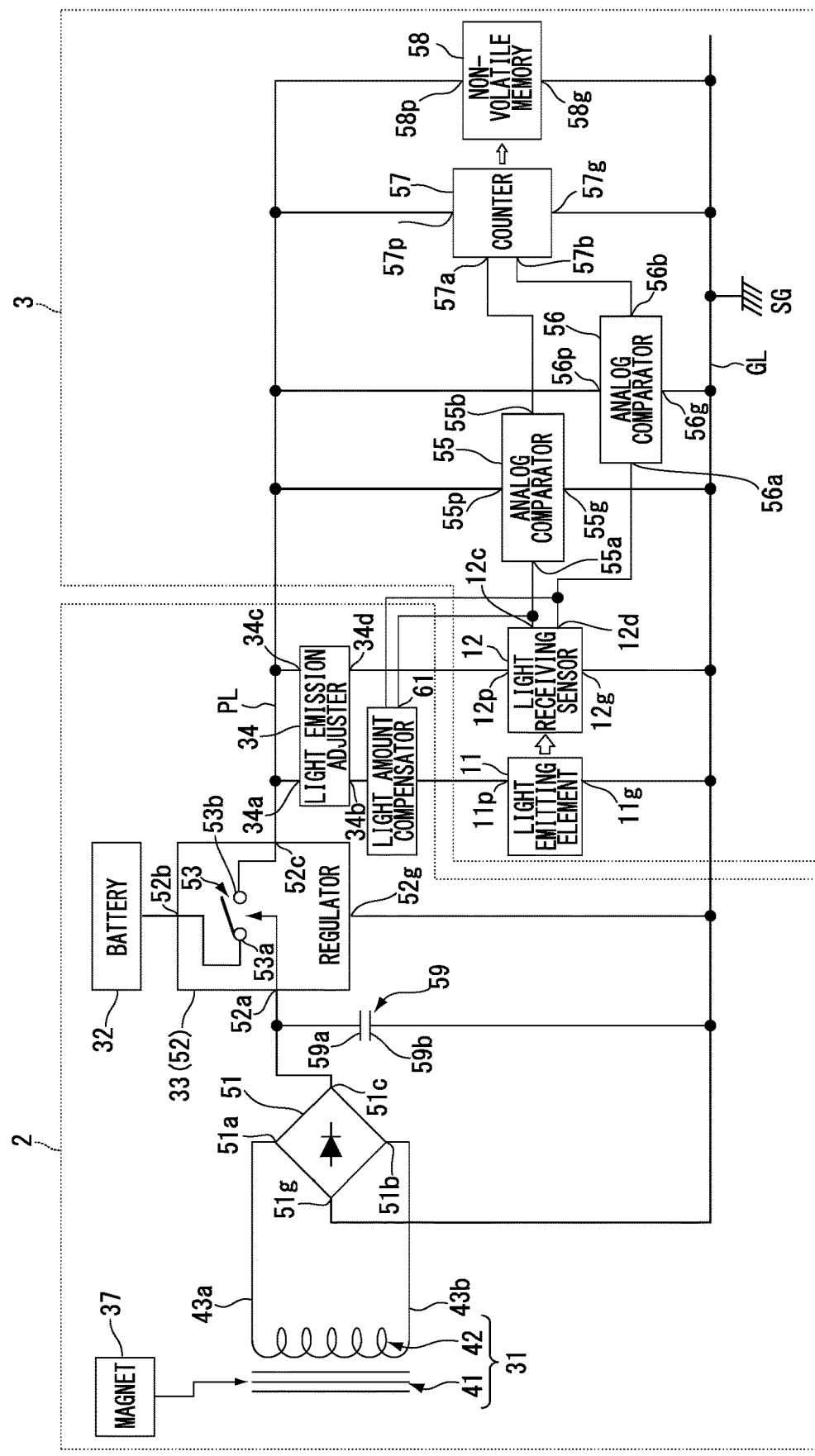
FIG. 7 is a diagram illustrating a circuit configuration of an encoder apparatus according to a second embodiment.

A second embodiment is described. In the second embodiment, the same configurations as in the above-mentioned embodiment are denoted by the same reference symbols, and descriptions thereof are omitted or simplified. FIG. 7 is a diagram illustrating a circuit configuration of an encoder apparatus EC according to the second embodiment. The encoder apparatus EC includes a light amount compensator 61. The light amount compensator 61 adjusts the light amount of light emitted from the light emitting element 11. For example, the light amount compensator 61 adjusts power supplied to the light emitting element 11, thereby adjusting the light emission amount of the light emitting element 11.

For example, the light amount compensator 61 is provided in a power supply path between the light emission adjuster 34 and the light emitting element 11. The light amount compensator 61 adjusts power switched to be supplied by the light emission adjuster 34, and supplies the adjusted power to the light emitting element 11. Light emission efficiency of the light emitting element 11 may decrease due to aged deterioration. For example, the light amount compensator 61 adjusts power supplied to the light emitting element 11 such that at least a part of the light emission amount decreased by aged deterioration is compensated. For example, based on the detection result of the light receiving sensor 12, the light amount compensator 61 adjusts power supplied to the light emitting element 11 such that the amount of light emitted from the light emitting element 11 approaches a predetermined value. For example, the light amount compensator 61 is connected to the first output terminal 12c of the light receiving sensor 12. For example, the light amount compensator 61 compares the level of the signal output from the first output terminal 12c with a threshold. For example, the light amount compensator 61 increases power supplied to the light emitting element 11 when the level of the signal output from the first output terminal 12c is lower than the threshold. In this case, even when the light emission efficiency of the light emitting element 11 has decreased due to aged deterioration, the level of the output signal of the light receiving sensor 12 is secured. The light amount compensator 61 is connected to the second output terminal 12d of the light receiving sensor 12. The light amount compensator 61 uses the signal output from the second output terminal 12d to adjust power supplied to the light emitting element 11 such that the amount of light emitted from the light emitting element 11 approaches a predetermined value.

For example, when the level of the signal output from the first output terminal 12c or the second output terminal 12d exceeds the threshold, the light amount compensator 61 may decrease power supplied to the light emitting element 11. In this case, power consumed by the light emitting element 11 is reduced, and hence the wear of the battery 32 is able to be suppressed. The light amount compensator 61 may adjust the amount of light emitted from the light emitting element 11 by using only one of the output signal from the first output terminal 12c and the output signal from the second output terminal 12d in the light receiving sensor 12. Alternatively, the light amount compensator 61 may adjust the amount of light emitted from the light emitting element 11 without using the detection result of the light receiving sensor 12. For example, the light amount compensator 61 may adjust the amount of light emitted from the light emitting element 11 based on the total light emission time of the light emitting element 11. The light amount compensator 61 may adjust the amount of light emitted from the light emitting element 11 in accordance with settings by a user. For example, when the level of the signal output from the light receiving sensor 12 exceeds a level that allows position information to be detected, the light emission amount of the light emitting element 11 may be adjusted in advance by the light amount compensator 61 so as to be decreased. When the level of the signal output from the light receiving sensor 12 is lower than the level that allows position information to be detected, the light emission amount of the light emitting element 11 may be adjusted by the light amount compensator so as to be increased. For example, the adjustment amount of the light amount by the light amount compensator is freely settable and adjustable in consideration of balance between anti-noise performance and the battery life. When priority is given to anti-noise performance, the light emission amount of the light emitting element 11 is set high. When priority is given to the battery life, the light emission amount of the light emitting element 11 is set low.

Third Embodiment

Figure 8:
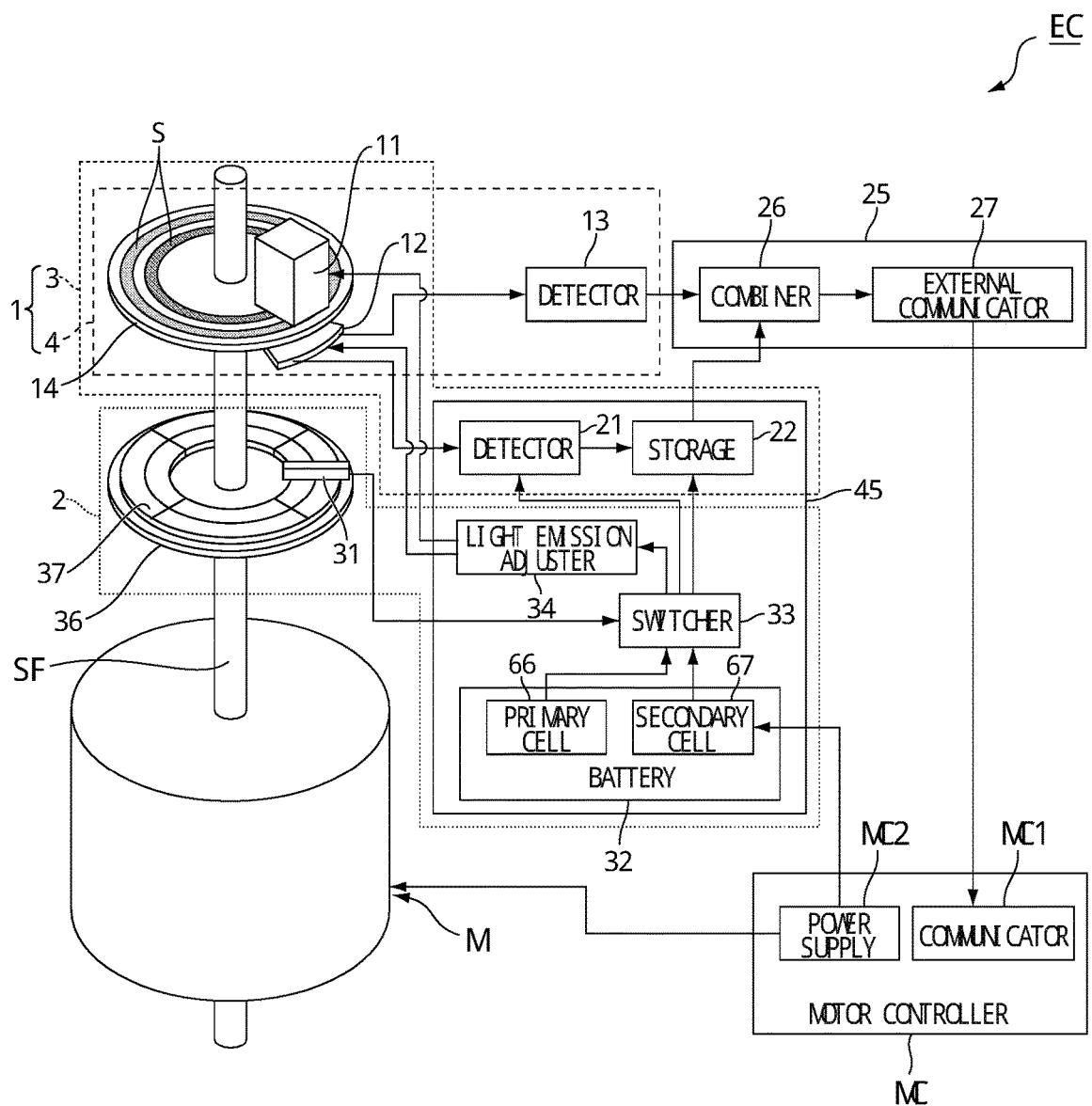
FIG. 8 is a diagram illustrating an encoder apparatus according to a third embodiment.

A third embodiment is described. In the third embodiment, the same configurations as in the above-mentioned embodiments are denoted by the same reference symbols, and descriptions thereof are omitted or simplified. FIG. 8 is a diagram illustrating an encoder apparatus EC according to the third embodiment. In the third embodiment, a battery 32 includes a primary cell 66 and a secondary cell 67. A motor controller MC includes a power supply MC2, and the secondary cell 67 is charged with power supplied from the power supply MC2. For example, the power supply MC2 is a power supply to supply power used to drive a rotation shaft SF (mover), and supplies power to a motor M. The secondary cell 67 is charged by being supplied with power from the power supply MC2 in the state in which the power supply MC2 is capable of supplying power to the motor M (for example, in the state in which the main power supply is turned on). At least a part of the charging to the secondary cell 67 is performed by using power of the electric signal generated by the electric signal generator (electric signal generation unit 31). In this case, the secondary cell 67 is able to be charged even in the state in which the supply of power to the encoder apparatus EC from the outside is interrupted (for example, when the power supply is OFF or power failure).

The battery 32 is capable of supplying at least a part of the power consumed by the position detection system 1 from the primary cell 66 or the secondary cell 67. For example, the primary cell 66 and the secondary cell 67 are electrically connected to the switcher 33, and the switcher 33 causes the supply of power from the primary cell 66 or from the secondary cell 67 to the detector 13 and the storage 22.

Figure 9:
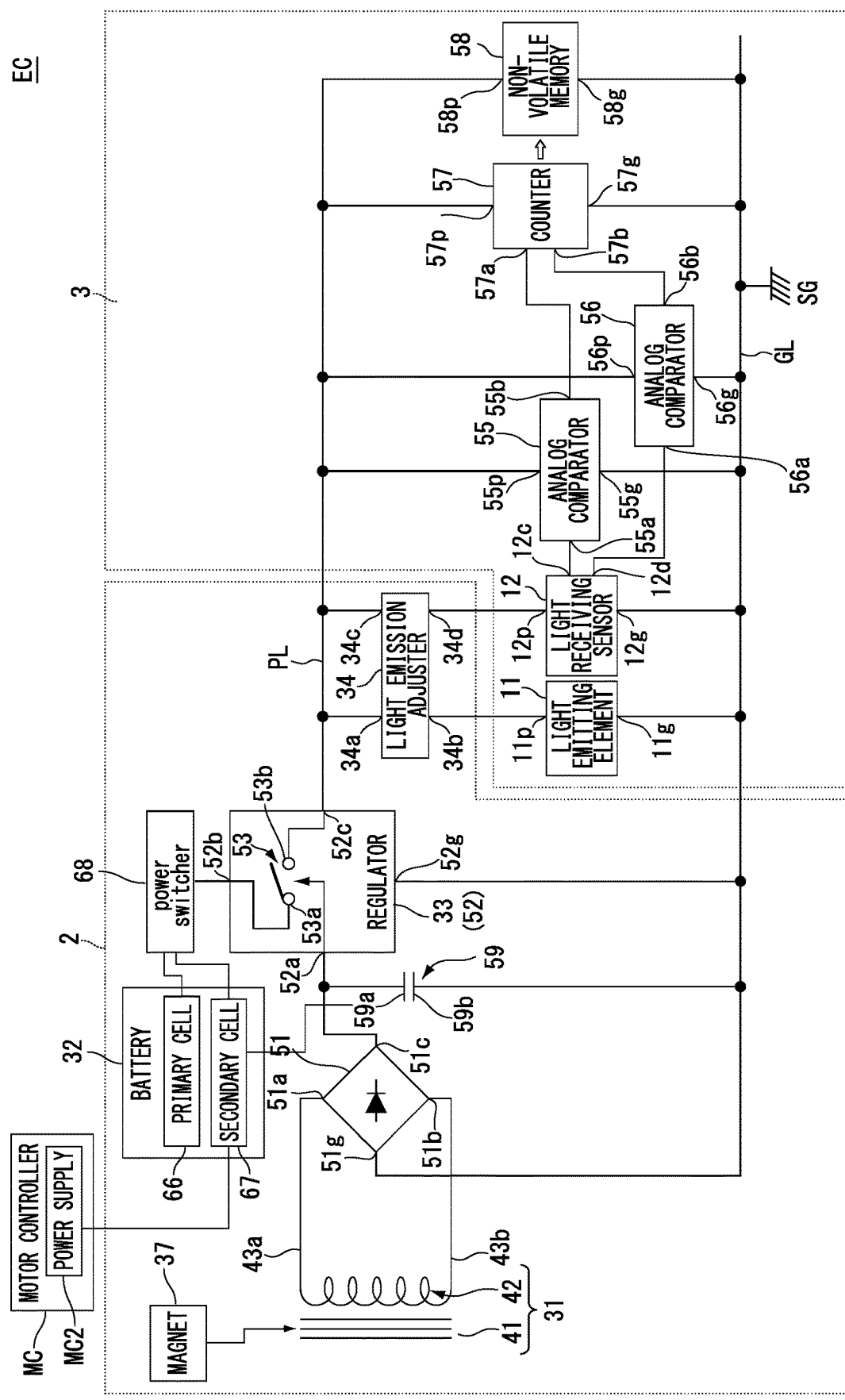
FIG. 9 is a diagram illustrating the circuit configuration of the encoder apparatus according to the third embodiment.

FIG. 9 is a diagram illustrating the circuit configuration of the encoder apparatus EC according to the third embodiment. The secondary cell 67 is electrically connected to the power supply MC2 in the motor controller MC. In at least a part of a period during which the power supply MC2 in the motor controller MC is capable of supplying power (for example, the on state of the main power supply), power is supplied from the power supply MC2 to the secondary cell 67, and the secondary cell 67 is charged with the power. In a period during which the power supply MC2 in the motor controller MC is incapable of supplying power (for example, the off state of the main power supply), the supply of power from the power supply MC2 to the secondary cell 67 is interrupted.

The secondary cell 67 is also electrically connected to a transmission path of the electric signal from the electric signal generation unit 31. The secondary cell 67 is able to be charged with power of the electric signal from the electric signal generation unit 31. For example, the secondary cell 67 is electrically connected to a circuit between the rectifier stack 51 and the regulator 52. In the state in which the supply of power from the power supply MC2 is interrupted, the secondary cell 67 is charged with power of the electric signal generated by the electric signal generation unit 31 in response to the rotation of the rotation shaft SF. The secondary cell 67 may be charged with power of an electric signal generated by the electric signal generation unit 31 when the rotation shaft SF is driven by the motor M to rotate.

The encoder apparatus EC according to the third embodiment selects which of the primary cell 66 and the secondary cell 67 is used to supply power to the position detection system 1 in the state in which the supply of power from the outside is interrupted. The power supply system 2 includes a power switcher 68, and the power switcher 68 switches (selects) which of the primary cell 66 and the secondary cell 67 is used to supply power to the position detection system 1. A first input terminal of the power switcher 68 is electrically connected to a positive electrode of the primary cell 66, and a second input terminal of the power switcher 68 is electrically connected to the secondary cell 67. An output terminal of the power switcher 68 is electrically connected to the input terminal 52b of the regulator 52.

For example, the power switcher 68 selects the primary cell 66 or the secondary cell 67 as a battery that supplies power to the position detection system 1 based on the remaining amount of the secondary cell 67. For example, when the remaining amount of the secondary cell 67 is equal to or more than a threshold, the power switcher 68 causes the supply of power from the secondary cell 67, but does not cause the supply of power from the primary cell 66. The threshold is set based on power to be consumed by the position detection system 1, and is set to, for example, power to be supplied to the position detection system 1 or more. For example, when power consumed by the position detection system 1 is able to be sourced from power from the secondary cell 67, the power switcher 68 performs control such that power is supplied from the secondary cell 67 and no power is supplied from the primary cell 66. When the remaining amount of the secondary cell 67 is less than the threshold, the power switcher 68 does not cause the supply of power from the secondary cell 67, but causes the supply of power from the primary cell 66. For example, the power switcher 68 may serve also as a charger that controls the charging of the secondary cell 67, and may determine whether the remaining amount of the secondary cell 67 is equal to or more than a threshold by using information on the remaining amount of the secondary cell 67 used to control the charging.

The encoder apparatus EC according to the third embodiment uses the secondary cell 67 in combination, thus enabling the wear of the primary cell 66 to be delayed. Consequently, the encoder apparatus EC is free from maintenance (for example, replacement) of the battery 32 or has low frequency of maintenance.

The battery 32 only needs to include at least one of the primary cell 66 and the secondary cell 67. In the above-mentioned embodiment, power is alternatively supplied from the primary cell 66 or the secondary cell 67, but power may be supplied from the primary cell 66 and the secondary cell 67 in parallel. For example, a processor to which power is supplied from the primary cell 66 and a processor to which power is supplied from the secondary cell 67 may be determined in accordance with power consumption of the processors (for example, the light emitting element 11, the light receiving sensor 12, the analog comparator 55, the analog comparator 56, the counter 57, the non-volatile memory 58) in the position detection system 1. The secondary cell 67 only needs to be charged by using at least one of power supplied from the power supply MC2 and power of an electric signal generated by the electric signal generation unit 31. The encoder apparatus EC is not necessarily required to include the battery 32. For example, power consumed by the position detection system 1 (for example, the multi-rotation information detector 3) may be sourced from power of the electric signal generated by the electric signal generation unit 31. In this case, the encoder apparatus EC is not necessarily required to include the switcher 33.

Figure 10A:
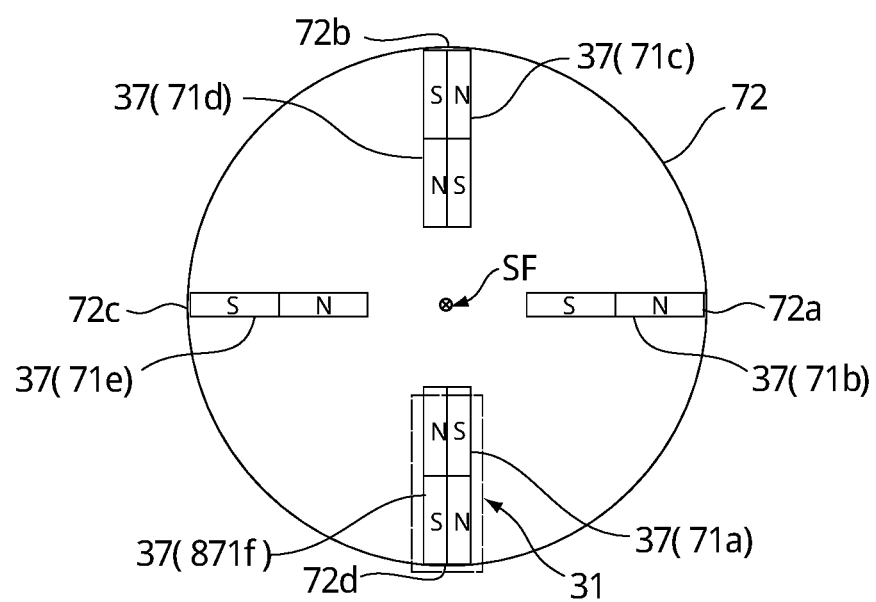
FIG. 10A to FIG. 10D include diagrams illustrating a part of an encoder apparatus in a modification.

Next, modifications are described. FIG. 10A to FIG. 10D are diagrams illustrating a part of encoder apparatuses in the modifications. The magnet 37 in each of the above-mentioned embodiments generates an AC magnetic field by the ring-shaped magnet (see FIG. 3A and FIG. 3B), but magnets 37 in FIG. 10A are rod magnets that generate an AC magnetic field. In the present modification, the magnets 37 include rod magnets 71a to 71f provided on a disc-shaped plate 72.

The plate 72 is fixed to a rotation shaft SF, and rotates integrally with the rotation shaft SF. The rod magnets 71a to 71f are fixed to the plate 72, and rotate integrally with the plate 72 and the rotation shaft SF. Each of the rod magnets 71a to 71f is disposed in substantially parallel to the radial direction of the plate 72.

The rod magnets 71a to 71c are disposed such that S poles face the center of the plate 72 (rotation shaft SF) and N poles face the radiation direction with respect to the rotation shaft SF (outer side of the plate 72). The rod magnet 71a is disposed near a position 72d on the plate 72. The rod magnet 71b is disposed at a position 72a on the plate 72. The rod magnet 71c is disposed near a position 72b on the plate 72.

The rod magnets 71d to 71f are disposed such that N poles face the center of the plate 72 (rotation shaft SF) and S poles face the radiation direction with respect to the rotation shaft SF (outer side of the plate 72). The rod magnet 71d is disposed near the position 72b on the plate 72 so as to be adjacent to the rod magnet 71c. The rod magnet 71e is disposed at a position 72c on the plate 72. The rod magnet 71f is disposed near the position 72d on the plate 72 so as to be adjacent to the rod magnet 71a.

In these magnets 37, when the position 72b or the position 72d on the plate 72 passes near the electric signal generation unit 31, the orientation of the magnetic field in the electric signal generation unit 31 is inverted, and power is output from the electric signal generation unit 31.

Figure 10B:
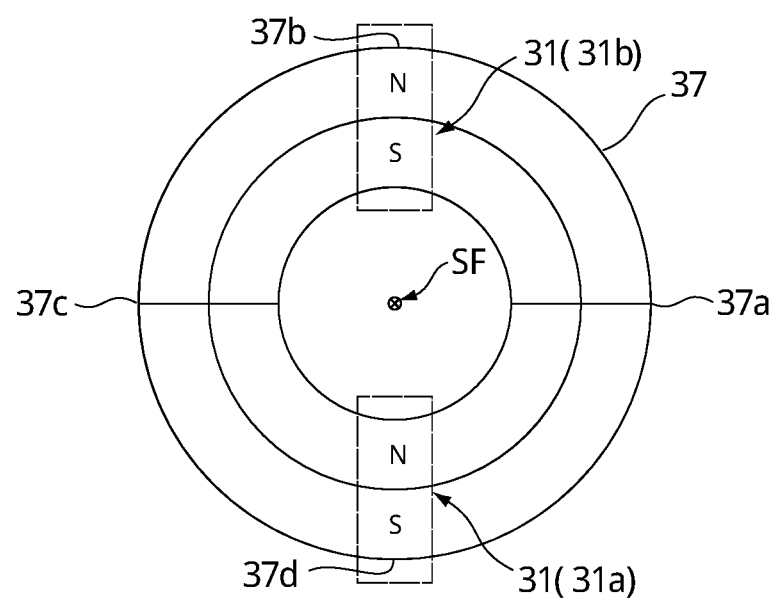

In a modification in FIG. 10B, an electric signal generation unit 31a and an electric signal generation unit 31b are provided as electric signal generation units 31. The electric signal generation unit 31b is disposed with a phase difference of 180° from the electric signal generation unit 31 in the circumferential direction of the magnet 37. When the position 37a on the magnet 37 passes near the electric signal generation unit 31, the position 37c on the magnet 37 passes near the electric signal generation unit 31c. In this manner, the electric signal generation unit 31a and the electric signal generation unit 31c generate power at substantially the same time, thus enabling power (level of electric signals) generated by the electric signal generation units 31 to be increased.

Figure 10C:
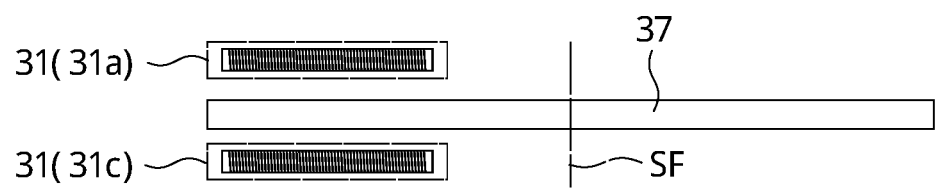

In a modification in FIG. 10C, an electric signal generation unit 31a and an electric signal generation unit 31c are provided as electric signal generation units 31. The electric signal generation unit 31c is provided on the side opposite to the electric signal generation unit 31a across the magnet 37. For example, the electric signal generation unit 31c is provided at the same angular position as that of the electric signal generation unit 31a in the circumferential direction of the magnet 37. In this encoder apparatus EC, the electric signal generation unit 31a and the electric signal generation unit 31c generate power at substantially the same time, thus enabling power (level of electric signals) generated by the electric signal generation units 31 to be increased.

Figure 10D:
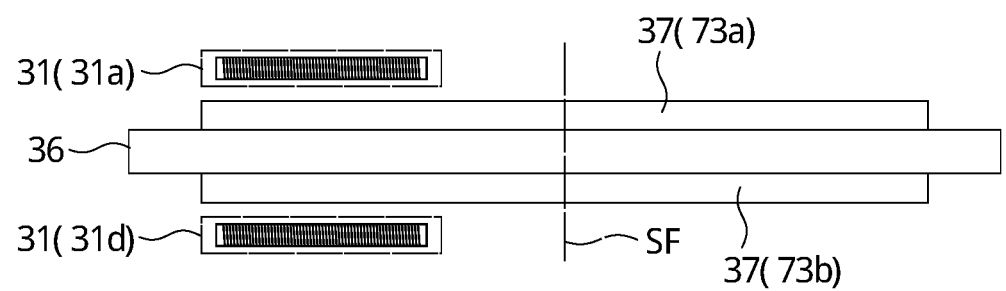

In a modification in FIG. 10D, a magnet 73a and a magnet 73b are provided as magnets 37. An electric signal generation unit 31a and an electric signal generation unit 31d are provided as electric signal generation units 31. The magnet 73a is disposed on the front surface of the disc plate 36 illustrated in FIG. 1 and others, and the magnet 73b is disposed on the rear surface thereof. The electric signal generation unit 31a is disposed near the magnet 73a, and generates power in response to a change in the magnetic field formed by the magnet 73a. The electric signal generation unit 31d is disposed near the magnet 73b, and generates power in response to a change in the magnetic field formed by the magnet 73b. In this manner, when a plurality of electric signal generation units are provided, the magnet 73a paired with the electric signal generation unit 31a and the magnet 73b paired with the electric signal generation unit 31d may be different members.

The number of electric signal generation units in the encoder apparatus EC may be three or more. The electric signal generation unit may be configured such that the magnetosensors and the generators are provided on one surface side and the other surface side of the magnets 37, and the magnetosensors and the generators are housed in one casing.

In the above-mentioned embodiments, the position detection system 1 detects rotation position information on the rotation shaft SF (mover) as position information, but may detect at least one of the position, speed, and acceleration in a predetermined direction as position information. The encoder apparatus EC may include a rotary encoder or a linear encoder. In the encoder apparatus EC, the generator and the detector may be provided to the rotation shaft SF and the magnet 37 may be provided outside the moving object (for example, the rotation shaft SF) such that the relative positions of the magnet and the detector change along with the movement of the mover. The position detection system 1 is not necessarily required to detect multi-rotation information on the rotation shaft SF, and the multi-rotation information may be detected by a processor outside the position detection system 1.

The electric signal generation unit 31 may supply at least a part of the power consumed by the position detection system 1. For example, the electric signal generation unit 31 may supply electric signals (current) generated by the generators to a light emission adjuster if the power supply system 2 includes no battery 32 (cell). For example, the electric signal generation unit 31 may supply power to a processor having relatively small power consumption in the position detection system 1. The power supply system 2 is not necessarily required to supply power to a part of the position detection system 1. For example, the power supply system 2 may intermittently supply power to the detector 21, and is not necessarily required to supply power to the storage 22. In this case, the storage may be supplied with power intermittently or continuously from a power supply or a battery provided outside the power supply system 2. The generator may generate power by a phenomenon other than large Barkhausen jump, and for example, may generate power by electromagnetic induction caused by a change in the magnetic field in response to the movement of a mover (for example, the rotation shaft SF). The storage that stores therein detection results of the detector may be provided outside the position detection system 1, and may be provided outside the encoder apparatus EC.

Figure 11:
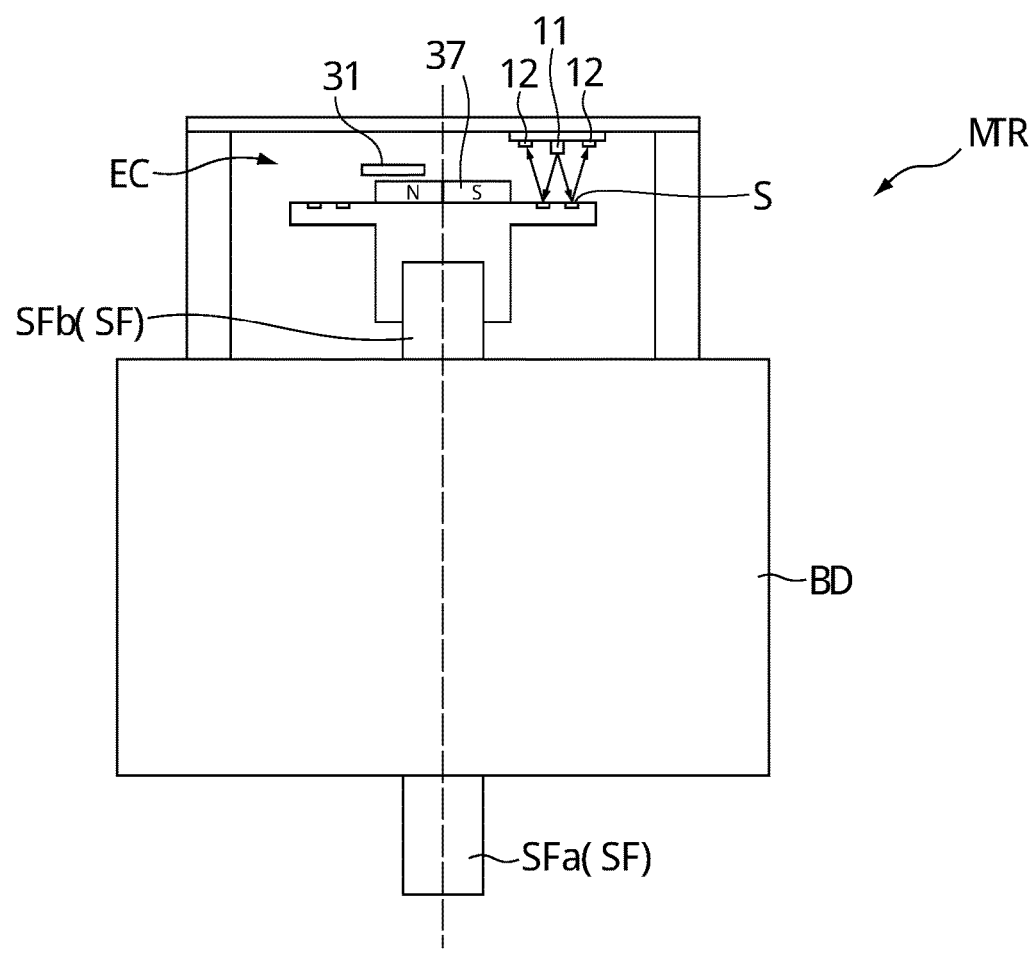
FIG. 11 is a diagram illustrating an example of a drive apparatus according to an embodiment.

Drive Apparatus Next, a drive apparatus is described. FIG. 11 is a diagram illustrating an example of a drive apparatus MTR. In the following description, the same or equivalent components as in the above-mentioned embodiments are denoted by the same reference symbols, and descriptions thereof are omitted or simplified. The drive apparatus MTR is a motor apparatus including an electric motor. The drive apparatus MTR includes a rotation shaft SF, a main body (driver) BD that rotationally drives the rotation shaft SF, and an encoder apparatus EC that detects rotation position information on the rotation shaft SF.

The rotation shaft SF has a load-side end SFa and an anti-load-side end SFb. The load-side end SFa is connected to another power transmission mechanism such as a reducer. A scale S is fixed to the anti-load-side end SFb through a fixture. The encoder apparatus EC is mounted together with the fixation of the scale S. The encoder apparatus EC is an encoder apparatus according to the above-mentioned embodiments, modifications, and a combination thereof.

In the drive apparatus MTR, the motor controller MC illustrated in FIG. 1 and others controls the main body BD by using a detection result of the encoder apparatus EC. In the drive apparatus MTR, the need of battery replacement of the encoder apparatus EC is eliminated or lowered, thus enabling maintenance cost to be reduced. The drive apparatus MTR is not limited to a motor apparatus, and may be another drive apparatus having a shaft that rotates by using hydraulic pressure or pneumatic pressure.

Figure 12:
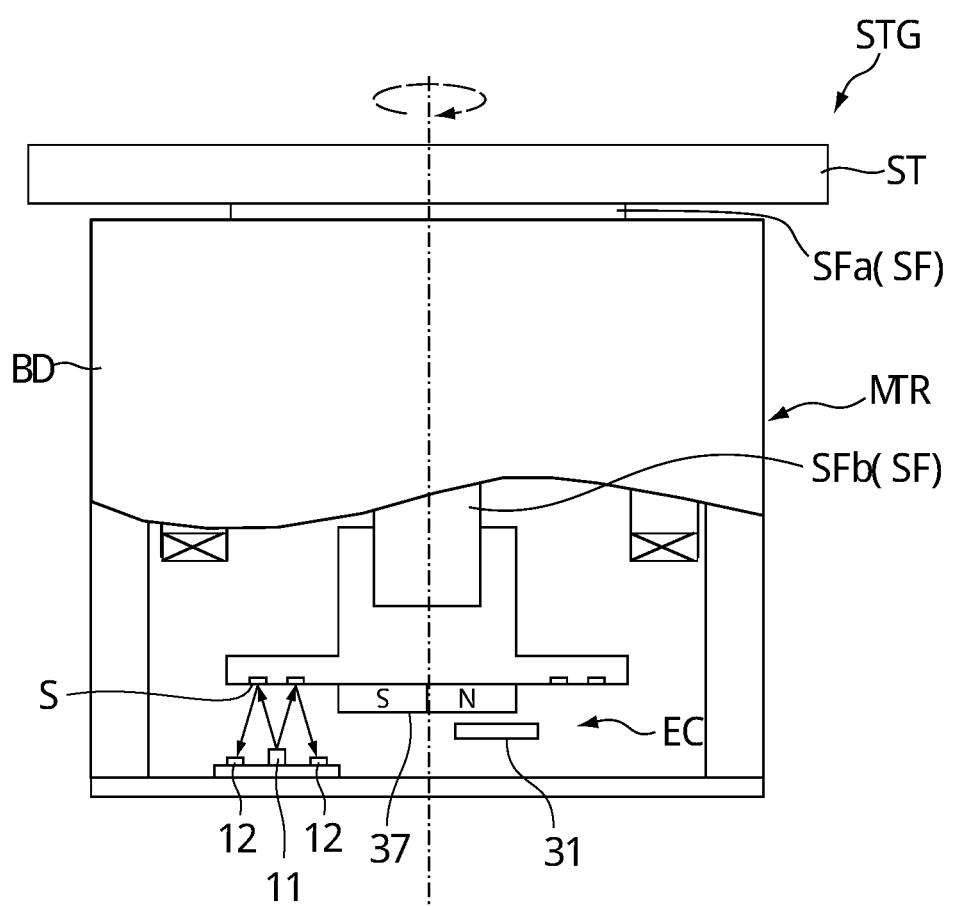
FIG. 12 is a diagram illustrating an example of a stage apparatus according to an embodiment.

Stage Apparatus Next, a stage apparatus is described. FIG. 12 is a diagram illustrating an example of a stage apparatus STG. The stage apparatus STG has a configuration in which a rotary table (moving object) TB is mounted to the load-side end SFa of the rotation shaft SF of the drive apparatus MTR illustrated in FIG. 11. In the following description, the same or equivalent components as in the above-mentioned embodiments are denoted by the same reference symbols, and descriptions thereof are omitted or simplified.

In the stage apparatus STG, when the drive apparatus MTR is driven to rotate the rotation shaft SF, the rotation of the rotation shaft SF is transmitted to the rotary table TB. At this time, the encoder apparatus EC detects an angular position or the like of the rotation shaft SF. The use of the output from the encoder apparatus EC thus enables an angular position of the rotary table TB to be detected. A reducer or other components may be arranged between the load-side end SFa of the drive apparatus MTR and the rotary table TB.

As described above, in the stage apparatus STG, the need of battery replacement of the encoder apparatus EC is lowered or eliminated, thus reducing maintenance cost. For example, the stage apparatus STG is applicable to a rotary table provided to a working machine such as a lathe.

Figure 13:
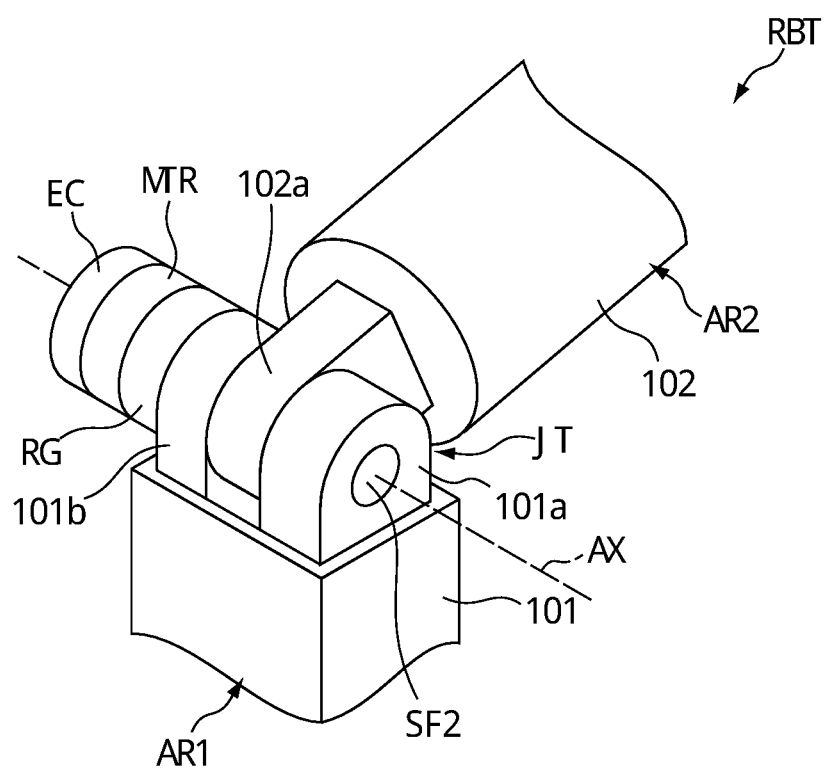
FIG. 13 is a perspective view illustrating an example of a robot apparatus according to an embodiment.

Robot Apparatus Next, a robot apparatus is described. FIG. 13 is a perspective view illustrating an example of a robot apparatus RBT. In FIG. 13, a part of the robot apparatus RBT (joint) is schematically illustrated. In the following description, the same or equivalent components as in the above-mentioned embodiments are denoted by the same reference symbols, and descriptions thereof are omitted or simplified. The robot apparatus RBT includes a first arm AR1, a second arm AR2, and a joint JT. The first arm AR1 is connected to the second arm AR2 through the joint JT.

The first arm AR1 includes an arm 101, a bearing 101a, and a bearing 101b. The second arm AR2 has an arm 102 and a connector 102a. The connector 102a is disposed between the bearing 101a and the bearing 101b at the joint JT. The connector 102a is provided integrally with a rotation shaft SF2. The rotation shaft SF2 is inserted through both the bearing 101a and the bearing 101b at the joint JT. An end of the rotation shaft SF2 that is inserted through the bearing 101b passes through the bearing 101b and is connected to a reducer RG.

The reducer RG is connected to the drive apparatus MTR, and reduces the rotation of the drive apparatus MTR to, for example, 1/100 and transmits the reduced rotation of the drive apparatus MTR to the rotation shaft SF2. Although not illustrated in FIG. 13, a load-side end SFa of the rotation shaft SF of the drive apparatus MTR is connected to the reducer RG. A scale S of the encoder apparatus EC is mounted to an anti-load-side end SFb of the rotation shaft SF of the drive apparatus MTR.

In the robot apparatus RBT, when the drive apparatus MTR is driven to rotate the rotation shaft SF, the rotation of the rotation shaft SF is transmitted to the rotation shaft SF2 through the reducer RG. The connector 102a rotates integrally with the rotation shaft SF2 by the rotation of the rotation shaft SF2. Thus, the second arm AR2 rotates with respect to the first arm AR1. At this time, the encoder apparatus EC detects the angular position and the like of the rotation shaft SF. The use of the output from the encoder apparatus EC thus enables the angular position of the second arm AR2 to be detected.

As described above, in the robot apparatus RBT, the need of battery replacement of the encoder apparatus EC is eliminated or lowered, thus enabling maintenance cost to be reduced. The robot apparatus RBT is not limited to the above-mentioned configuration, and the drive apparatus MTR is applicable to various kinds of robot apparatuses having joints.

The technical scope of the present invention is not limited to the aspects described in the above-mentioned embodiments. One or more elements described in the above-mentioned embodiments may be omitted. The elements described in the above-mentioned embodiments are able to be combined as appropriate. As far as permitted by the applicable law, the disclosure of all the documents cited in the above-mentioned embodiments, for example, is incorporated herein by reference.

In the encoder apparatus according to the above-mentioned embodiments, ON and OFF of the battery may be switched based on the electric signal generated by the electric signal generation unit, and power consumed by at least a part of the position detection system (for example, the light emitting element 11, the detector 21, the storage 22) may be sourced from power from the battery. In the encoder apparatus according to the above-mentioned embodiments, the electric signal generated by the electric signal generation unit may be extracted as power, and power consumed by at least a part of the position detection system (for example, the light emitting element 11, the detector 21, the storage 22) may be sourced from the extracted power.

DESCRIPTION OF REFERENCE SIGNS 1 position detection system, 2 power supply system, 3 multi-rotation information detector, 11 light emitting element (light emitter), 12 light receiving sensor (light detector), 21 detector, 22 storage, 31 electric signal generation unit (electric signal generator), 32 battery, 33 switcher, 34 light emission adjuster, 61 light amount compensator, EC encoder apparatus, MTR drive apparatus, RBT robot apparatus, S scale, STG stage apparatus

The invention claimed is:

1. An encoder apparatus, comprising:
   a scale;
   a position detection system including
      a light emitter that irradiates the scale with light;
      a light receiving sensor that detects the light from the scale; and
      a detect circuit that detects position information on a mover based on a detection result of the light receiving sensor;
   an electric signal generator that generates an electric signal in response to movement of the mover;
   a light emission adjuster that controls the light emitter and the light receiving sensor;
   a battery; and
   a regulator that adjusts power supplied from the battery to the light emission adjuster based on the electric signal, wherein
   the scale includes a first scale and a second scale positioned circumferentially inward of the first scale, and
   the light emitter irradiates both the first scale and the second scale in response to power being supplied from the battery to the light emission adjuster.

2. The encoder apparatus according to claim 1, wherein the light emission adjuster adjusts timing of changing intensity of light emitted from the light emitter.

3. The encoder apparatus according to claim 1, wherein the light emission adjuster adjusts timing of switching between a turned-on state and a turned-off state of light emitted from the light emitter.

4. The encoder apparatus according to claim 1, wherein the electric signal is used to switch between conduction and interruption in a circuit included in the position detection system.

5. The encoder apparatus according to claim 1, wherein the light emission adjuster starts the emission of light from the light emitter based on the electric signal.

6. The encoder apparatus according to claim 1, wherein the light emission adjuster stops causing the emission of light from the light emitter when a predetermined time has elapsed since start of the emission of light from the light emitter.

7. The encoder apparatus according to claim 1, wherein the light emission adjuster stops causing the emission of light from the light emitter after the light receiving sensor detects light from the scale.

8. The encoder apparatus according to claim 1, wherein the light emission adjuster switches between supplying and not supplying power to the light emitter.

9. The encoder apparatus according to claim 1, wherein the mover includes a rotation shaft,
   the position detection system further includes a multi-rotation information detect circuit that detects multi-rotation information on the rotation shaft based on a detection result of the light receiving sensor, and
   the light emission adjuster stops causing the emission of light from the light emitter in at least a part of a period during which the multi-rotation information detect circuit operates.

10. The encoder apparatus according to claim 1, wherein the mover includes a rotation shaft,
    the position detection system further includes:
       a multi-rotation information detect circuit that detects multi-rotation information on the rotation shaft based on a detection result of the light receiving sensor; and
       a storage that stores therein the multi-rotation information on the rotation shaft, and
    the light emission adjuster stops causing the emission of light from the light emitter in at least a part of a period during which the storage writes the multi-rotation information.

11. The encoder apparatus according to claim 1, wherein the battery supplies at least a part of power consumed by the position detection system in accordance with the electric signal generated by the electric signal generator.

12. The encoder apparatus according to claim 11, wherein the regulator switches between supply and no supply of power from the battery to the detect circuit in accordance with the electric signal generated by the electric signal generator, wherein
    the light emission adjuster is provided in a power supply path between the regulator and the light emitter.

13. The encoder apparatus according to claim 1, wherein the light emission adjuster includes a light amount compensator that adjusts an amount of light emitted from the light emitter.

14. The encoder apparatus according to claim 13, wherein the light amount compensator adjusts power supplied to the light emitter such that the amount of light emitted from the light emitter approaches a predetermined value based on a detection result of the light receiving sensor.

15. The encoder apparatus according to claim 1, wherein the electric signal generator includes:
    a magnet that moves in conjunction with the mover; and
    a magnetosensor that causes a Barkhausen jump by a change in a magnetic field caused by movement of the magnet.

16. The encoder apparatus according to claim 1, wherein each of the first scale and the second scale have a ring shape.

17. The encoder apparatus according to claim 1, wherein the battery includes a first cell and a second cell, and
    the encoder apparatus further includes another regulator that selects one of the first cell and the second cell to supply the power supplied from the battery based on an amount of charge of the second cell, and causes the power supplied from the battery to be supplied from only the selected one of the first cell and the second cell.

18. The encoder apparatus according to claim 17, wherein the second cell is connected to a transmission path between the electric signal generator and the light emission adjuster, and is charged with power from the electric signal, and
    the first cell is not connected to the transmission path.

* * * * *

UNITED STATES PATENT AND TRADEMARK OFFICE
CERTIFICATE OF CORRECTION

| | |
|---|---|
| PATENT NO. | : 11,385,081 B2 |
| APPLICATION NO. | : 16/036115 |
| DATED | : July 12, 2022 |
| INVENTOR(S) | : Goto |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
Eleventh Day of February, 2025

Coke Morgan Stewart
*Acting Director of the United States Patent and Trademark Office*